United States Patent [19]

Jain et al.

[11] Patent Number: 5,377,310
[45] Date of Patent: Dec. 27, 1994

[54] CONTROLLING UNDER-ACTUATED ROBOT ARMS USING A HIGH SPEED DYNAMICS

[75] Inventors: Abhinandan Jain, Altadena; Guillermo Rodriguez, La Canada, both of Calif.

[73] Assignee: The United States of America as represented by the Administrator of the National Aeronautics and Space Administration, Washington, D.C.

[21] Appl. No.: 866,779

[22] Filed: Apr. 3, 1992

[51] Int. Cl.$^5$ .............................................. G06F 15/00
[52] U.S. Cl. ....................................... 395/95; 395/97; 395/98
[58] Field of Search .................... 395/95, 96, 97, 98, 395/86; 901/27, 28, 29

[56] References Cited

U.S. PATENT DOCUMENTS

| | | | |
|---|---|---|---|
| 4,156,835 | 5/1979 | Whitney et al. | 595/95 |
| 4,283,764 | 8/1981 | Crum et al. | 901/9 |
| 4,547,858 | 10/1985 | Horak | 318/568.11 |
| 4,594,671 | 6/1986 | Sugimoto | 395/97 |
| 4,604,716 | 8/1986 | Kato et al. | 395/86 |
| 4,706,204 | 11/1987 | Hattori | 395/97 |
| 4,725,942 | 2/1988 | Osuka | 395/97 |
| 4,725,965 | 2/1988 | Keenan | 395/89 |
| 4,794,547 | 12/1988 | Nishida | 395/97 |
| 4,808,063 | 2/1989 | Haley | 395/95 |
| 4,835,710 | 5/1989 | Schnelle et al. | 395/97 |
| 4,928,047 | 5/1990 | Arai et al. | 395/80 |
| 4,972,347 | 11/1990 | Tarvin et al. | 395/98 |
| 4,975,856 | 12/1990 | Vold et al. | 395/98 |
| 4,999,553 | 3/1991 | Seraji | 395/86 |
| 5,020,001 | 5/1991 | Yamamoto et al. | 395/97 |
| 5,053,687 | 10/1991 | Merlet | 901/28 |
| 5,179,514 | 1/1993 | Rastegar et al. | 364/167.01 |
| 5,214,749 | 5/1993 | Brown | 395/95 |

OTHER PUBLICATIONS

A. Jain, "Unified Formulation of Dynamics for Serial Rigid Multibody Systems," Journal of Guidance, Control and Dynamics, vol. 14, pp. 531–542, May–Jun. 1991.

Meldrum et al, "An Order (N) Recursive Inversion of the Jacobian for an N–Link Serial Manipulator", Proc 1991 IEEE Int'l Conf on Robotics and Automation, Apr. 9–11, 1991, vol. 2 pp. 1175–1180.

G. Rodrigues, K. Kreutz, and A. Jain, "A Spatial Operator Algebra for Manipulator Modeling and Control," The International Journal of Robotics Research, vol. 10, pp. 371–381, Aug. 1991.

(List continued on next page.)

*Primary Examiner*—Allen R. MacDonald
*Assistant Examiner*—Stuart B. Shapiro
*Attorney, Agent, or Firm*—John H. Kusmiss; Thomas H. Jones; Guy M. Miller

[57] ABSTRACT

The invention controls an under-actuated robot manipulator by first obtaining predetermined active joint accelerations of the active joints and the passive joint friction forces of the passive joints, then computing articulated body quantities for each of the joints from the current positions of the links, and finally computing from the articulated body quantities and from the active joint accelerations and the passive joint forces, active joint forces of the active joints. Ultimately, the invention transmits servo commands corresponding to the active joint forces thus computed to respective ones of the joint servos.

The computation of the active joint forces is accomplished using a recursive dynamics algorithm. In this computation, an inward recursion is first carried out for each link beginning with the outermost link in order to compute the residual link force of each link from the active joint acceleration if the corresponding joint is active or from the known passive joint force if the corresponding joint is passive. Then, an outward recursion is carried out for each link beginning with the innermost link in which the active joint force is computed from the residual force if the corresponding joint is active or the passive joint acceleration is computed from the residual link force if the corresponding joint is passive.

27 Claims, 10 Drawing Sheets

OTHER PUBLICATIONS

Rodriguez, "Spatial Operator Approach to Flexible Manipulator Inverse and Forward Dynamics", 1990 IEEE Int'l Conf. on Robotics & Automation, May 13-18, 1990, vol. 2 pp. 845-850.

Jain et al, "Recursive Dynamics for Geared Robot Manipulators", Proc of 29th IEEE Conf on Decision and Control, Dec. 5-7, 1990, vol. 3 pp. 1983-1988.

Y. Umetani and K. Yoshida, "Resolved Motion Rate Control of Space Manipulators with Generalized Jacobian Matrix," IEEE Transactions on Robotics and Automation vol. 5, pp. 303-314, Jun. 1989.

Arai et al, "Dynamic Control of a Manipulator with Passive Joints in an Operational Coordinate Space", Proc. of 1991 IEEE Int'l Conf on Robotics & Automation, Apr. 1991, pp. 1188-1194 vol. 2.

J. Arai and S. Tachi, "Position control of manipulator with passive joints using dynamic coupling," IEEE Transactions on Robotics and Automation, vol. 7, pp. 528-534, 1991.

A. Jain and G. Rodriquez, "Kinematics and Dynamics of Under-Actuated Manipulators," IEEE International Conference on Robotics and Automation, (Sacramento, Calif.), Apr. 1991.

J. Baillieul, "The Nonlinear Control Theory of Super-Articulated Mechanisms," Proc. American Control Conference, (San Diego, Calif.), pp. 2448-2451, May 1990.

J. Luh, M. Walker, and R. Paul, "On-line Computational Scheme for Mechanical Manipulators," ASME Journal of Dynamic Systems, Measurement, and Control, vol. 102, pp. 69-76, Jun. 1980.

S. Dubowsky and Z. Vafa, "A Virtual Manipulator Model for Space Robotic Systems," Proceedings of the Workshop on Space Telerobotics, (Pasadena, Calif.), 1987.

Y. Nakamura and R. Mukherjee, "Nonholonomic Path Planning for Space Robots," IEEE International Conference on Robotics and Automation, (Scottsdale, Ariz.), May 1989.

E. Papadopoulos and S. Dubowsky, "On the Nature of Control Algorithms for Space Manipulators," IEEE International Conference on Robotics and Automation), (Cincinnati, Ohio), May 1990.

Featherstone, "The Calculation of Robot Dynamics using Articulated-Body Inertias," The International Journal of Robotics Research, vol. 2, pp. 13-30, Spring 1983.

CONTROLLING UNDER-ACTUATED ROBOT ARMS USING A HIGH SPEED DYNAMICS

ORIGIN OF THE INVENTION

The invention described herein was made in the performance of work under a NASA contract, and is subject to the provisions of Public Law 96-517 (35 USC 202) in which the contractor has elected not to retain title.

BACKGROUND OF THE INVENTION

1. Technical Field

The invention relates to under-actuated robot manipulators and more particularly to a method and apparatus for controlling robot arms having plural joints, some of the joints being passive in that they have no joint servos, using a high speed recursive dynamics algorithm to solve for the active joint torque commands required to achieve a user-specified velocity profile of the end-effector and, if desired, of the joints themselves.

2. Background Art

1. Introduction

An extensive amount of research on the kinematics, dynamics and control of robots has been carried out for regular (or fully-actuated) manipulators. Each degree of freedom of regular manipulators is active, i.e., it has associated with it an actuator which can be used to control the manipulator. However, many important applications include manipulators with passive degrees of freedom, i.e., degrees of freedom lacking control actuators. A passive degree of freedom can arise from either an absence of an actuator, failure of the actuator, or due to a mode of operation which precludes the use of the actuator. We refer to manipulators with passive degrees of freedom as under-actuated manipulators. Thus, for under-actuated manipulators, the number of available control actuators is less than the number of degrees of freedom. Examples of under-actuated manipulators include

- free-flying space robots with inactive reaction jets.
- hyper-redundant robots for whom not all hinges are actuated.
- manipulators with flexible joints and hinges.
- manipulators loosely grasping an articulated object.
- manipulators with actuator failures, and the design of fault-tolerant control algorithms.

Each of these important areas has received varying degrees of attention from researchers, resulting in the development of useful, though largely application specific techniques for the analysis and control of these systems. The usefulness and applicability of these techniques to other types of under-actuated manipulators is difficult to see. For instance, the large amount of research on free-flying space-robots has resulted in analysis techniques that make extensive use of the conservation of momentum property. These techniques however cannot be applied to under-actuated systems where such momentum constraints do not hold.

The analysis of under-actuated manipulators is significantly more complex when compared with regular manipulators. There is inertial coupling between the motion of the active and the passive hinges, so that mappings such as the Jacobian function depend not only on the kinematical properties, but also on the inertia properties of the links. The presence of passive degrees of freedom also typically results in a lack of full controllability of the system.

In the remainder of this specification, the description herein refers to various individual publications listed below by number by reciting, for example, "reference [1]", or "reference [2]", or simply "[1] or "[2]", and so forth.

References

[1] H. Arai and S. Tachi, "Position control of manipulator with passive joints using dynamic coupling," IEEE Transactions on Robotics and Automation, vol. 7, pp. 528–534, 1991.

[2] A. Jain and G. Rodriguez, "Kinematics and Dynamics of Under-Actuated Manipulators," in IEEE International Conference on Robotics and Automation, (Sacramento, Calif.), Apr. 1991.

[3] J. Baillieul, "The Nonlinear Control Theory of Super-articulated Mechanisms," in Proc. American Control Conference, (San Diego, Calif.), pp. 2448–2451, May 1990.

[4] G. Rodriguez, K. Kreutz, and A. Jain, "A Spatial Operator Algebra for Manipulator Modeling and Control," The International Journal of Robotics Research, vol. 10, pp. 371–381, Aug. 1991.

[5] A. Jain, "Unified Formulation of Dynamics for Serial Rigid Multibody Systems," Journal of Guidance, Control and Dynamics, vol. 14, pp. 531–542, May-Jun. 1991.

[6] J. Luh, M. Walker, and R. Paul, "On-Line Computational Scheme for Mechanical Manipulators," ASME Journal of Dynamic Systems, Measurement, and Control, vol. 102, pp. 69–76, Jun. 1980.

[7] A. Jain and G. Rodriguez, "Recursive Flexible Multibody System Dynamics using Spatial Operators," Journal of Guidance, Control and Dynamics, 1992. In press.

[8] S. Dubowsky and Z. Vafa, "A Virtual Manipulator Model for Space Robotic Systems," in Proceedings of the Workshop on Space Telerobotics (G. Rodriguez, ed.), (Pasadena, Calif.), 1987.

[9] Y. Umetani and K. Yoshida, "Resolved Motion Rate Control of Space Manipulators with Generalized Jacobian Matrix," IEEE Transactions on Robotics and Automation, vol. 5, pp. 303–314, Jun. 1989.

[10] Y. Nakamura and R. Mukherjee, "Nonholonomic Path Planning for Space Robots," in IEEE International Conference on Robotics and Automation, (Scottsdale, Ariz.), May 1989.

[11] E. Papadopoulos and S. Dubowsky, "On the Nature of Control Algorithms for Space Manipulators," in IEEE International Conference on Robotics and Automation, (Cincinnati, Ohio), May 1990.

[12] R. Featherstone, "The Calculation of Robot Dynamics using Articulated-Body Inertias," The International Journal of Robotics Research, vol. 2, pp. 13–30, Spring 1983.

Some early work on the control of such manipulators can be found in reference [1–3].

We make extensive use of techniques from the spatial operator algebra [4]. In Section 3 below, we review the spatial operator approach and develop the equations of motion for a regular manipulator. A model for under-actuated manipulators and their equations of motion is described in Section 4 below. Spatial operator identities are then used to develop closed form expressions for the generalized accelerations for the system. These expressions form the basis for a recursive $O(N)$ dynamics algorithm described in Section 5 below. Expressions for the disturbance and generalized Jacobians that relate the motion of the active hinges to the motion of the passive hinges and to the motion of the end-effector respectively are developed in Section 6 below, and a system for controlling an under-actuated robot with redundant (i.e., 7 or more) joints using the disturbance Jacobian is described.

2. Nomenclature

Coordinate free spatial notation is used throughout this specification (see [4,5] for additional details). The notation $\tilde{l}$ denotes the cross-product matrix associated with the 3-dimensional vector l, while x* denotes the transpose of a matrix x. In the stacked notation used in this specification, indices are used to identify quantities pertinent to a specific link. Thus for instance, V denotes the vector of the spatial velocities of all of the links in a serial manipulator, and V(k) denotes the spatial velocity vector for the $k^{th}$ link. Some key quantities used in this specification are defined below.

$n$ number of links in the manipulator
$O_k$ body frame for $k^{th}$ link
$O_k^+$ outboard frame on the $(k + 1)^{th}$ link
$r(k)$ number of degrees of freedom for $k^{th}$ joint
$N = \Sigma_{k=1}^{n} r(k)$, the overall degrees of freedom for the manipulator
$\theta(k) \in \Re^{r(k)}$, the vector of generalized coordinates for the $k^{th}$ hinge
$\beta(k) \in \Re^{r(k)}$, the vector of generalized velocities for the $k^{th}$ hinge
$l(k,j) \in \Re^3$, the vector from the $k^{th}$ to the $j^{th}$ body frame $$\phi(k,j) \triangleq \begin{pmatrix} I & \tilde{l}(k,j) \\ 0 & I \end{pmatrix} \in \Re^{6 \times 6}, \text{ the spacial transformation}$$

operator from the $j^{th}$ hinge to the $k^{th}$ hinge $H^*(k) \in \Re^{6 \times r(k)}$, the joint map matrix for the $k^{th}$ hinge
$m(k)$ mass of the $k^{th}$ link $p(k) \in \Re^3$, the vector from $O_k$ to the center of mass of the $k^{th}$ link
$J(k) \in \Re^{3 \times 3}$, the inertia matrix for the $k^{th}$ link about $O_k$ $$M(k) = \begin{pmatrix} J(k) & m(k)\tilde{p}(k) \\ -m(k)\tilde{p}(k) & m(k)I_3 \end{pmatrix} \in \Re^{6 \times 6}, \text{ the}$$

spatial inertia of the $k^{th}$ link referred to $O_k$ $$V(k) = \begin{pmatrix} \omega(k) \\ v(k) \end{pmatrix} \in \Re^6, \text{ the spatial velocity of the } k^{th} \text{ link referred}$$

to $O_k$, with $\omega(k)$ and $v(k)$ denoting the angular and linear velocity components respectively $$a(k) = \begin{pmatrix} \tilde{\omega}(k) & 0 \\ 0 & \tilde{\omega}(k+1) \end{pmatrix} [V(k) - V(k+1)] \in \Re^6,$$

the Coriolis acceleration for the $k^{th}$ link referred to $O_k$ $$b(k) = \begin{pmatrix} \tilde{\omega}(k)J(k)\omega(k) \\ m(k)\tilde{\omega}(k)\tilde{\omega}(k)p(k) \end{pmatrix} \in \Re^6, \text{ the centrifugal force for}$$

the $k^{th}$ link referred to $O_k$ $\alpha(k) \in \Re^6$, the spatial acceleration of the $k^{th}$ link referred to $O_k$ $$f(k) = \begin{pmatrix} N(k) \\ F(k) \end{pmatrix} \in \Re^6, \text{ the spatial force of interaction between}$$

the $(k + 1)^{th}$ and the $k^{th}$ link referred to $O_k$, with $N(k)$ and $F(k)$ denoting the moment and force components respectively $T(k) \in \Re^{r(k)}$, the generalized force for the $k^{th}$ hinge
$M \in \Re^{N \times N}$, the mass matrix for the manipulator
$C \in \Re^N$, vector of Coriolis and centrifugal forces for the manipulator $A_p, A_a$ the passive and active manipulator subsystems of an under-actuated manipulator
$n_p, n_a$ the number of passive and active hinges respectively
$N_p, N_a$ the number of passive and active degrees of freedom respectively
$I_p, I_a$ the set of indices of the passive and active hinges respectively

3. Dynamics of Regular Manipulators

We consider a serial manipulator with n rigid body links. As shown in FIG. 1, the links are numbered in increasing order from tip to base.

The outer most link is denoted link 1 and the inner most link is denoted link n.

Each link has two frames denoted $O_k$ and $O_k^+$ attached to it. Frame $O_k$ is on the inboard side is the body frame for the $k^{th}$ link. The $k^{th}$ hinge connects the $k+1)^{th}$ and $k^{th}$ links and its motion is defined as the motion of frame $O_k$ with respect to frame $O_{k+1}^+$. Free space motion of the manipulator is handled by using 6 degree of freedom hinges between the base link and an inertial frame. The $k^{th}$ hinge is assumed to have $r(k)$ degrees of freedom where $1 \leq r(k) \leq 6$, and its vector of generalized coordinates is denoted $\theta(k)$. For simplicity, and without any loss in generality, we assume that the number of generalized velocities for the hinge is also $r(k)$, i.e., there are no nonholonomic constraints on the hinge. The vector of generalized speeds for the $k^{th}$ hinge is denoted $\beta(k) \in \Re^{r(k)}$. The choice of the hinge angle rates $\dot{\beta}(k)$ for the generalized speeds $\beta(k)$ is often an obvious and convenient choice. However, when the number of hinge degrees of freedom is larger than 1, alternative choices are often preferred since they lead to simplifying decoupling of the kinematic and dynamic parts of the equations of motion. An example is the use of the relative angular velocity (rather than the Euler angle rates( for the generalized speeds vector in the case of a free-flying system. The overall number of degrees of freedom for the manipulator is given by $N = \Sigma_{k=1}^{n} r(k)$.

Coordinate free spatial notation is used throughout this specification (see [4,5]). The spatial velocity $V(k)$ of the $k^{th}$ body frame $O_k$ is defined as $$V(k) = \begin{pmatrix} \omega(k) \\ v(k) \end{pmatrix} \in \Re^6,$$

with $\omega(k)$ and $v(k)$ denoting the angular and linear velocities of $O_k$. The relative spatial velocity across the $k^{th}$ hinge is given by $H^*(k)\beta(k)$ where $H^*(k) \in \Re^{6 \times r(k)}$ is the joint map matrix for the hinge. The spatial force of interaction $f(k)$ across the $k^{th}$ hinge is denoted $$f(k) = \begin{pmatrix} N(k) \\ F(k) \end{pmatrix} \in \Re^6,$$

with $N(k)$ and $F(k)$ denoting the moment and force components respectively. The spatial inertia $M(k)$ of the $k^{th}$ link referred to $O_k$ is defined as $$M(k) = \begin{pmatrix} J(k) & m(k)\tilde{p}(k) \\ -m(k)\tilde{p}(k) & m(k)I_3 \end{pmatrix} \in \Re^{6\times 6}$$

where $m(k)$ is the mass, $p(k)\in\Re^3$ is the vector from $O_k$ to the center of mass, and $J(k)\in\Re^{3\times 3}$ is the inertia of the $k^{th}$ link about $O_k$.

With $V(k)$ denoting the spatial velocity, $\alpha(k)$ the spatial acceleration, $f(k)$ the spatial force and $T(k)$ the hinge force at $O_k$ for the $k^{th}$ link, the following Newton-Euler recursive equations [6,4] describe the equations of motion for the serial manipulator:

$$\begin{cases} V(n+1) = 0. \quad \alpha(n+1) = 0 \\ \text{for } k = n \ldots 1 \\ V(k) = \phi^*(k+1,k)V(k+1) + H^*(k)\beta(k) \\ \alpha(k) = \phi^*(k+1,k)\alpha(k+1) + H^*(k)\dot{\beta}(k) + a(k) \\ \text{end loop} \end{cases} \quad (3.1)$$

$$\begin{cases} f(0) = 0 \\ \text{for } k = 1 \ldots n \\ f(k) = \phi(k+1,k)f(k-1) + M(k)\alpha(k) + b(k) \\ T(k) = H(k)f(k) \\ \text{end loop} \end{cases}$$

where $a(k)$ and $b(k)$ denote the velocity dependent Coriolis and centrifugal acceleration term and a gyroscopic force term respectively. $\phi(k,k-1)$ denotes the transformation operator from $O_{k-1}$ to $O_k$ and is given by $$\phi(k,k-1) = \begin{pmatrix} I_3 & \tilde{l}(k,k-1) \\ 0 & I_3 \end{pmatrix} \in \Re^{6\times 6}$$

We use spatial operators [4] to obtain compact expressions for the equations of motion and other key dynamical quantities. As we see later, they are also very useful analysis tools. The vector $\theta \triangleq [\theta^*(1), \ldots \theta^*(n)]^* \in \Re^N$ denotes the vector of generalized coordinates for the manipulator. Similarly, we define the vectors of generalized speeds $\beta \in \Re^N$ and generalized (hinge) forces $T \in \Re^N$ for the manipulator. The vector of spatial velocities $V$ is defined as $V \triangleq [V^*(1) \ldots V^*(n)]^* \in \Re^{6n}$. The vector of spatial accelerations is denoted $\alpha \in \Re^{6n}$, that of the Coriolis accelerations by $a \in \Re^{6n}$, the link centrifugal forces by $b \in \Re^{6n}$, and the link interaction spatial forces by $f \in \Re^{6n}$. Note that the components of the vectors $a$ and $b$ are nonlinear functions of the velocities and expressions for them are given in Section 2. The equations of motion for the serial manipulator can be written as follows (see [4] for details):

$$V = \phi^* H^* \beta \quad (3.2a)$$

$$\alpha = \phi^* [H^* \dot{\beta} + a] \quad (3.2b)$$

$$f = \phi[M\alpha + b] \quad (3.2c)$$

$$T = Hf = M\dot{\beta} + C \quad (3.2d)$$

where $$M \triangleq H\phi M \phi^* H^* \in \Re^{N \times N} \quad (3.3a)$$

$$C \triangleq H\phi[M\phi^* a + b] \in \Re^N \quad (3.3b)$$

and $H \triangleq \text{diag}\{H(k)\}$, $M \triangleq \text{diag}\{M(k)\}$.

$$\epsilon_\phi \triangleq \begin{pmatrix} 0 & 0 & & 0 & 0 & & 0 \\ \phi(2,1) & 0 & \ldots & & 0 & & 0 \\ 0 & \phi(3,2) & \ldots & & 0 & & 0 \\ \vdots & & & & & & \vdots \\ \vdots & & & & & & \vdots \\ 0 & 0 & \ldots & & \phi(n,n-1) & & 0 \end{pmatrix} \quad (3.4a)$$

$$\phi \triangleq (I - \epsilon_\phi)^{-1} = \begin{pmatrix} I & 0 & \ldots & 0 \\ \phi(2,1) & I & \ldots & 0 \\ \vdots & & & \vdots \\ \vdots & & & \vdots \\ \phi(n,1) & \phi(n,2) & \ldots & I \end{pmatrix} \quad (3.4b)$$

with $$\phi(i,j) \triangleq \phi(i,i-1) \ldots \phi(j+1,j) \text{ for } i > j$$

The spatial transformation operator $\phi(k,j)$ is defined as $$\begin{pmatrix} I & \tilde{l}(k,j) \\ 0 & I \end{pmatrix} \in \Re^{6 \times 6}$$

with $l(k,j) \in \Re^3$, denoting the vector from the $k^{th}$ to the $j^{th}$ body frame. The notation $\tilde{l}$ denotes the cross-product matrix associated with the 3-dimensional vector M is the mass matrix of the manipulator and the vector C contains the velocity dependent Coriolis and centrifugal hinge forces. External forces on any link in the manipulator are handled by adding their sum effect to the component of the b vector for that link.

Using 0 as the index to represent the end-effector frame, the spatial velocity $V(0)$ of the end-effector is given by $$V(0) = \phi^*(1,0)V(1) = BV = B\phi^* H^* \dot{\beta}$$

where the operator B is given by $$B \triangleq [\phi^*(1,0), 0, \ldots 0]^* \in \Re^{6n \times 6}$$

Thus the operator expression for the end-effector Jacobian is given by [4], $$J \triangleq B^* \phi^* H^* \quad (3.5)$$

The model described above for the manipulator with rigid links is general enough to carry over in essentially the same manner to manipulators (such as free-flying space robots, flexible link manipulators etc.) which have degrees of freedom which are not necessarily associated with physical hinges. This is possible mainly due to the use of the operators approach in which all types of manipulator degrees of freedom share essentially similar mathematical representations. Thus for flexible link manipulators, the detailed structure of $\phi(\ldots)$ and $H(.)$ needs to be appropriately modified [7]. The equations of motion for flexible link manipulators have the same operator form as in Eq. (3.2) and Eq. (3.3) above. For a free-flying space manipulator, the degrees of freedom associated with the base body can be modeled as a 6 degree of freedom hinge between the base body and the inertial frame. Thus the use of the terminology hinge is not necessarily restricted to physical hinges alone.

SUMMARY OF THE INVENTION

The invention controls an under-actuated robot manipulator by first obtaining predetermined active joint accelerations of the active joints and the passive joint friction forces of the passive joints, then computing articulated body quantities for each of the joints from the current positions of the links, and finally computing from the articulated body quantities and from the active joint accelerations and the passive joint forces, active joint forces of the active joints. Ultimately, the invention transmits servo commands corresponding to the active joint forces thus computed to respective ones of the joint servos.

The computation of the active joint forces is accomplished using a recursive dynamics algorithm. In this computation, an inward recursion is first carried out for each link beginning with the outermost link. This inward recursion consists of computing a residual link force from a residual link force of a previous link, from a corresponding one of the active joint accelerations if the corresponding joint is active and from a corresponding one of the passive joint forces if the corresponding joint is passive. Then, an outward recursion is carried out for each link beginning with the innermost link. The outward recursion consists of computing a link acceleration from a link acceleration of a previous link, computing from the link acceleration an active joint force if the corresponding joint is an active joint, computing a passive joint acceleration if the corresponding joint is a passive joint, and revising the link acceleration based upon the joint acceleration of the corresponding joint.

The articulated body quantities include an effective link inertia, a joint inertia, a joint to link force operator and a null force operator. They are computed in an inward recursion carried out for each link beginning at the outermost link. This latter inward recursion consists of computing the effective link inertia from the effective link inertia of a previous link, then, if the corresponding joint is passive, computing the joint inertia from the effective link inertia, the joint to link force operator from the effective link inertia and from the joint inertia, and the null force operator from the joint to link force operator, or, if the corresponding joint is active, setting the null force operator equal to an identity operator; and, finally, revising the effective link inertia by transforming it by the null force operator.

The predetermined active joint accelerations are derived from the user's specified motion of a particular link, such as the end effector or tip, for example, in a preferred embodiment of the invention. This is accomplished by computing a generalized Jacobian operator relating the desired acceleration of the particular one link specified by the user to the active joint accelerations of the active joints, and then multiplying the desired acceleration of the selected one link by the generalized Jacobian operator to produce the active joint accelerations of the active joints. The generalized Jacobian operator is obtained using a modified version of the recursive dynamic algorithm referred to above with reference to the computation of the active joint forces.

For redundant under-actuated robot manipulators, the invention enables the user to employ well-known redundancy resolution techniques by imposing predetermined motion constraints. For this purpose, the unknown passive joint accelerations are immediately computed by first computing a disturbance Jacobian operator relating the unknown passive joint accelerations to the predetermined active joint accelerations, and then multiplying the active joint accelerations by the disturbance Jacobian operator to produce the passive joint accelerations. The user than knows all joint accelerations, and may then use them to compute the motion parameters related to the predetermined motion constraints, and from these, perform the well-known redundancy resolution techniques to control the robot manipulator. The disturbance Jacobian is formed from intermediate quantities produced during the modified recursive dynamics algorithm referred to above with reference to computing the generalized Jacobian.

DETAILED DESCRIPTION OF THE INVENTION

4. Modeling of Under-Actuated Manipulators

We use the term active degree of freedom for manipulator degree of freedom which has associated with it a control actuator. A passive degree of freedom on the other hand is a manipulator degree of freedom with no control actuator. Due to the presence of friction, stiffness etc., the generalized force associated with a passive degree of freedom need not necessarily be zero. For a free-flying space manipulator with no reaction jets, all the manipulator hinge degrees of freedom are active degrees of freedom. However, the positional and orientation degrees of freedom for the base-body are passive degrees of freedom. In the case of manipulators with link or joint flexibility, the degrees of freedom associated with the flexible degrees of freedom are passive, while the hinge degrees of freedom are all active.

We refer to hinges with all active (passive) degrees of freedom as active (passive) hinges. In general, the component degrees of freedom of multiple degree of freedom hinges may be a mix of active and passive degrees of freedom. However, we make the notationally convenient assumption that all the hinges in the manipulator are either active or passive hinges. This assumption imposes no loss in generality since any multiple degree of freedom hinge can be decomposed equivalently into a concatenation of active and passive hinges. Thus, for the purposes of discussion, we assume that a manipulator with hinges containing a mix of passive and active degrees of freedom has been replaced by an equivalent manipulator model consisting only of hinges which are either active or passive hinges.

The number of passive hinges in the manipulator system is denoted $n_p$, and $I_p$ denotes the set of indices of the passive hinges $I_a$ denotes the corresponding set of indices of the active hinges and $n_a = (n - n_p)$ the number of active hinges in the manipulator system. The total number of passive degrees of freedom $N_p$, is given by $N_p$ $$(= \Sigma_{k \in I_p} r(k)),$$

while the total number of active degrees of freedom $N_a$, is given by $N_a$ $$(= \Sigma_{k \in I_a} r(k)).$$

Note that $N_a + N_p = N$.

Figure 1:
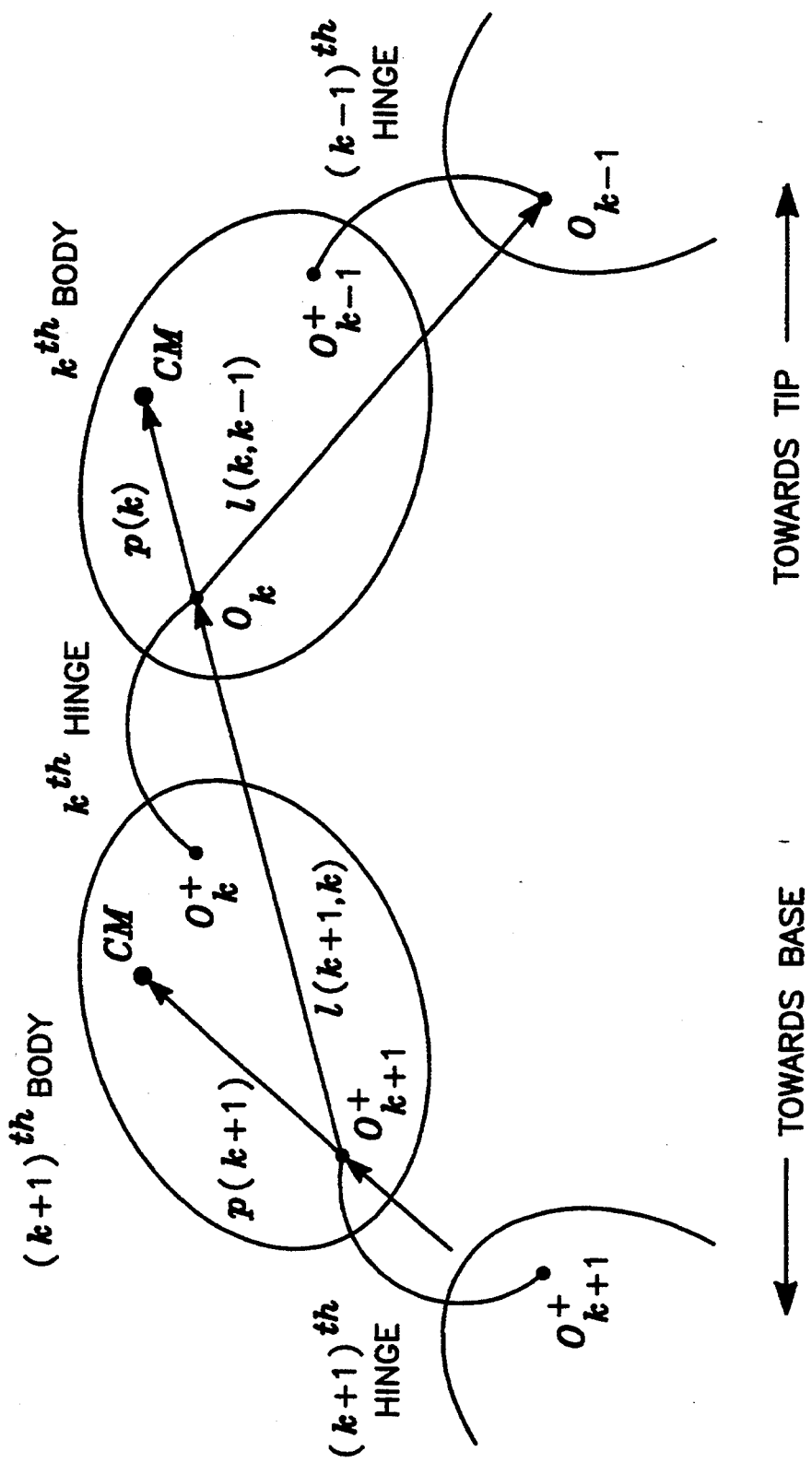
FIG. 1 is a diagram illustrating a portion of an under-actuated robot manipulator and illustrating the coordinate system employed in the preferred embodiment of the invention.
Figure 2:
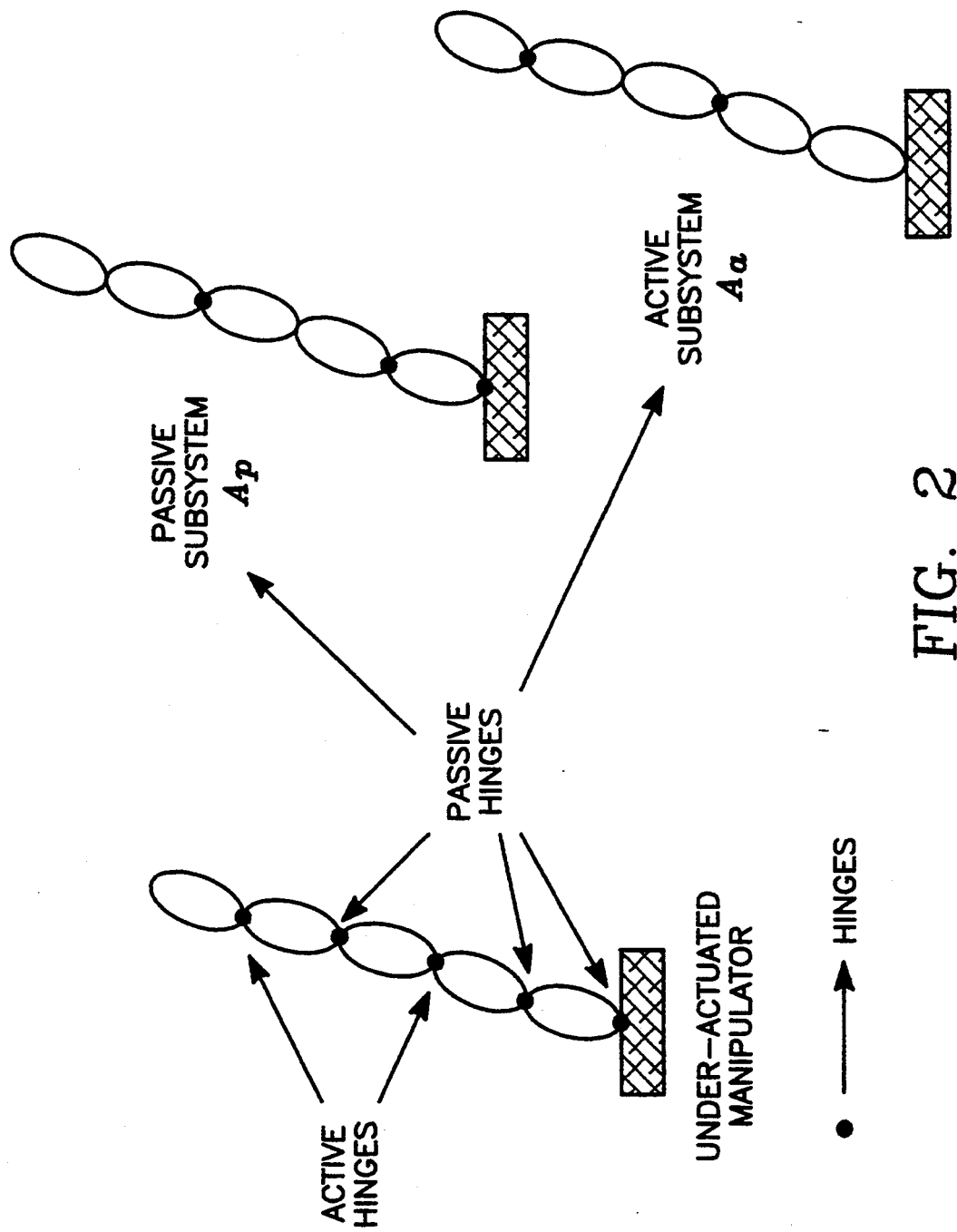
FIG. 2 is a diagram illustrating the decomposition of the under-actuated robot of FIG. 1 into active and passive subsystems, in accordance with the invention.

We use the sets $I_a$ and $I_p$ to decompose the manipulator into a pair of component manipulator subsystems: the active arm $A_a$, and the passive arm $A_p$, $A_a$ is the $N_a$ degree of freedom manipulator resulting from freezing all the passive hinges (i.e. all those whose index is in $I_p$), while $A_p$ is the $N_p$ degree of freedom manipulator resulting from freezing all the active hinges (i.e. all those whose index is in the set $I_a$). This decomposition is illustrated in FIG. 2.

Let $\beta_a \in \mathcal{R}^{N_a}$, $T_a \in \mathcal{R}^{N_a}$ and $H^*_a \in \mathcal{R}^{6n \times N_a}$ denote the vector of generalized speeds. the vector of hinge forces and the joint map matrix for arm $A_a$. Similarly, let $\beta_p \in \mathcal{R}^{N_p}$, $T_p \in \mathcal{R}^{N_p}$ and $H^*_p \in \mathcal{R}^{6n \times N_p}$ denote the corresponding quantities for arm $A_p$. Note that the two vectors $\beta_a \in \mathcal{R}^{N_a}$ and $\beta_p \in \mathcal{R}^{N_p}$, represent a decomposition of the vector of generalized speeds $\beta$ for the whole manipulator in a manner consistent with the sets $I_a$ and $I_p$ respectively. Similarly $T_a$ and $T_p$ are decompositions of T, and $H^*_a$ and $H^*_p$ are decompositions of $H^*$. The columns of $H^*$ which correspond to the active hinges appear as columns of $H^*_a$, while those that correspond to the passive hinges appear as columns of $H^*_p$. Thus it follows that $$H^*_a \beta_a + H^*_p \beta_p = H^* \beta \tag{4.1}$$

4.1 Equations of Motion

We use the above decomposition to rewrite the equations of motion in Eq. (3.2) in the following partitioned form:

$$\begin{pmatrix} M_{aa} & M_{ap} \\ M_{ap}^* & M_{pp} \end{pmatrix} \begin{pmatrix} \dot{\beta}_a \\ \dot{\beta}_p \end{pmatrix} + \begin{pmatrix} C_a \\ C_p \end{pmatrix} = \begin{pmatrix} T_a \\ T_p \end{pmatrix} \tag{4.2}$$

where with $i,j \in \{p,a\}$ we have $$M_{ij} \triangleq H_i \phi M \phi^* H^*_j, \text{ and } C_i \triangleq H_i \phi [b + M \phi^* a] \tag{4.3}$$

Note that in Eq. (4.3), the submatrices $M_{aa}$ and $M_{pp}$ are the mass matrices for the $A_a$ and $A_p$ arms respectively. The mathematically partitioned form in Eq. (4.2) by no means implies that the above formulation is restricted to manipulators in which the active and passive hinges are present in separate clusters.

In order to control control the manipulator, it is important to compute the actuator forces required to obtain a desired motion of the active hinges, and also the effect of this motion on the passive hinges. That is, it is necessary to compute the active hinge forces $T_a$ required to obtain a desired active hinge acceleration $\dot{\beta}_a$, as well as the acceleration $\dot{\beta}_p$ induced at the passive hinges. The passive hinge forces vector $T_p$ is typically obtained from (frictional, stiffness etc.) models for the passive hinges. A simple rearrangement of eq. (4.2) puts it in the form $$\begin{pmatrix} S_{aa} & S_{ap} \\ -S_{ap}^* & S_{pp} \end{pmatrix} \begin{pmatrix} \dot{\beta}_a \\ T_p \end{pmatrix} + \begin{pmatrix} C_a - S_{ap} C_p \\ -S_{pp} C_p \end{pmatrix} = \begin{pmatrix} T_a \\ \dot{\beta}_p \end{pmatrix} \tag{4.4}$$

where $$S_{aa} \triangleq M_{aa} - M_{ap} M_{pp}^{-1} M_{ap}^* \tag{4.5}$$
$$S_{ap} \triangleq M_{ap} M_{pp}^{-1}$$
$$S_{pp} \triangleq M_{pp}^{-1}$$

In Eq. (4.4), the quantities to be computed appear on the right. The direct use of Eq. (4.4) to obtain $\dot{\beta}_p$ and $T_a$ requires the computation of M, the inversion of $M_{pp}$ and the formation of various matrix/matrix and matrix/vector products. The computational cost of this dynamics algorithm is cubic in $N_p$ and quadratic in $N_a$. Another approach of similar computational complexity consists of adding additional constraints to the equations of motion of the system.

The presence of the constraints requires additional steps such as constraint stabilization during the integration of the equations of motion. Later, in Section 5 we describe a new O(N) dynamics algorithm that overcomes these limitations. This new algorithm, does not require the computation of M, and its complexity is linear in both $N_a$ and $N_p$.

4.2 Under-Actuated Manipulators with Integrals of Motion

We now take a brief look at a special and important class of under-actuated manipulators which possess certain integrals of motion. The nonlinear velocity dependent term $C_p$ has the form $$C_p = \dot{M}_{pa} \beta_a + \dot{M}_{pp} \beta_p - \tfrac{1}{2} \nabla \theta_p [\beta^* M \beta]$$

Thus we can rewrite the lower half of Eq. (4.2) (or equivalently Eq. (4.4)) in the form $$\frac{d[M_{p\alpha}\beta_\alpha + M_{pp}\beta_p]}{dt} - \frac{1}{2}\nabla_{\theta_p}[\beta^* M\beta] = T_p \quad (4.6)$$

However, if the under-actuated manipulator is such that the passive hinge generalized coordinates, $\theta_p$, are ignorable coordinates, i.e.

$$\nabla_{\theta_p}[\beta^* M\beta] = 0 \quad (4.7)$$

then the left-hand side of Eq. (4.6) is an exact differential and we can rewrite Eq. (4.6) in the form $$M_{p\alpha}\beta_\alpha + M_{pp}\beta_p = [M_{p\alpha}, M_{pp}]\beta = \int_{t_0}^{t} T_p dt + \text{constant} \quad (4.7)$$

Eq. (4.7) is equivalent to a time-varying, non-linear constraint on the generalized velocities of the system. If in addition. $T_p=0$, the left-hand side of Eq. (4.7) is constant, and is indeed an integral of motion for the manipulator.

Free-flying space manipulators are an important example of under-actuated manipulators with integrals of motion. For these manipulators, the reaction jets at the base are used sparingly in order to conserve fuel. As a result, the orientation and positional degrees of freedom of the base body form a 6 degree of freedom passive hinge. However, these degrees of freedom are ignorable coordinates because the kinetic energy of the manipulator does not depend on the overall orientation or position of the overall manipulator. As a consequence Eq. (4.7) holds for such systems. The left hand side of the equation is physically the spatial momentum of the space manipulator, while $T_p$ is the spatial force from the reaction jets. When the jets are completely off (i.e. $T_p=0$), the spatial momentum of the space manipulator stays constant. While the conservation of the linear momentum is a holonomic constraint, the conservation of angular momentum is a nonholonomic constant on the system. The motion and control of free-flying space manipulators has been extensively studied [8–11].

4.3 Spatial Operator Expression for $M_{pp}^{-1}$

Since $M_{pp}$ is the mass matrix of the passive arm $A_p$, operator factorization and inversion techniques developed in [4] for regular manipulators can be used to obtain a closed form spatial operator expression for $M_{pp}^{-1}$. First, we define the quantities $P(.), D_p(.), G_p(.), K_p(.), \bar{\tau}_p(.), P^+(.)$ and $\psi(.,.)$ for the manipulator links using the following recursive algorithm. In the following algorithm. $H_p(k)$ is the joint map matrix which maps a link vector to a joint vector and consists of the joint axis unit vectors of a passive joint k; P(k) is the articulated link inertia (or effective link inertia) of any link k; $D_p(k)$ is the joint inertia about a passive joint k; $G_p(k)$ is a joint to link force mapping operator and maps a link force to a resulting passive joint acceleration; and, $\tau_p(k)$ is a null force operator which accounts for the component of force resulting in no joint acceleration:

$$\begin{cases} P^+(0) = 0 \\ \text{for } k = 1 \ldots n \\ \quad P(k) = \phi(k,k-1)P^+(k-1)\phi^*(k,k-1) + M(k) \\ \quad \begin{cases} \text{if } k \in I_p \\ \quad D_p(k) = H_p(k)P(k)H_p^*(k) \\ \quad G_p(k) = P(k)H_p^*(k)D_p^{-1}(k) \\ \quad K_p(k+1,k) = \phi(k+1,k)G_p(k) \\ \quad \bar{\tau}_p(k) = I - G_p(k)H_p(k) \\ \text{else} \\ \quad \bar{\tau}_p(k) = I_6 \\ \text{end if} \end{cases} \\ \quad P^+(k) = \bar{\tau}_p(k)P(k) \\ \quad \psi(k+1,k) = \phi(k+1,k)\bar{\tau}_p(k) \\ \text{end loop} \end{cases} \quad (4.8)$$

Figure 3:
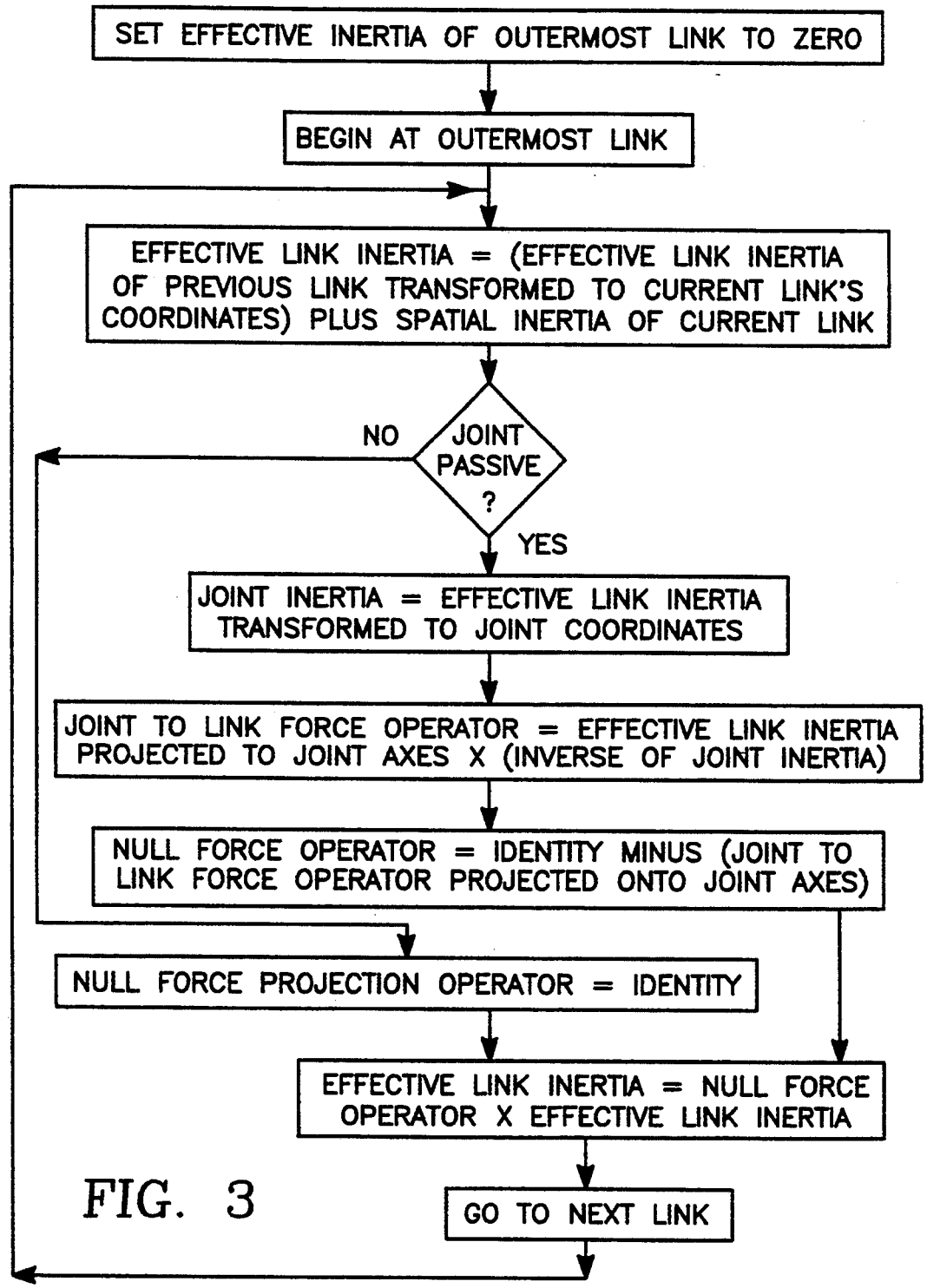
FIG. 3 is a block diagram illustrating the computation of the articulated body quantities of a system decomposed in accordance with FIG. 2.

$I_6$ above denotes the 6×6 identity matrix. The foregoing algorithm is illustrated in FIG. 3. The quantities defined in Eq. (4.8) are very similar to the articulated body quantities required for the O(N) forward dynamics algorithm for regular manipulators [12.4]. When we restrict our attention to the hinges of the $A_p$ passive arm alone, these quantities are precisely the articulated body quantities for the $A_p$ manipulator.

We can visualize the recursion in Eq. (4.8) as a walk from the tip to the base of the manipulator. At each hinge, we check whether the hinge is an active or a passive hinge. Depending on the status of the hinge, the appropriate computations are carried out and the walk continues on to the next hinge. This continues until the base body is reached.

The operator $P \in \mathfrak{R}^{6n \times 6n}$ is defined as a block diagonal matrix with its $k^{th}$ diagonal element being $P(k) \in \mathfrak{R}^{6 \times 6}$. The quantities in Eq. (4.8) are also used to define the following spatial operators:

$$D \triangleq H_p P H_p^* \in \mathfrak{R}^{Np \times p}$$

$$G_p \triangleq P H_p^* D_p^{-1} \in \mathfrak{R}^{6n \times np}$$

$$K_p \triangleq E_\phi G_p \in \mathfrak{R}^{6n \times np}$$

$$\bar{\tau}_p I \triangleq G_p H_p \in \mathfrak{R}^{6n \times 6n}$$

$$E_p \triangleq E_\phi \bar{\tau}_p \in \mathfrak{R}^{6n \times 6n} \quad (4.9)$$

The operators $D_p$, $G_p$ and $\bar{\tau}_p$ are all block diagonal. Even though $K_p$ and $E_\psi$ are not block diagonal matrices, their only nonzero block elements are the elements $K_p(k,k-1)$'s and $\psi(k,k-1)$'s respectively along the first subdiagonal. It is easy to verify from Eq. (4.8) that P satisfies the equation $$M = P - E_{104} P E_\psi^* = P - E_\phi P E_\psi^* \quad (4.10)$$

Now define the lower-triangular operator $\psi \in \mathfrak{R}^{6n \times 6n}$ as $$\psi = (I - E_\psi)^{-1} \quad (4.11)$$

Its block elements $\psi(i,j) \in \mathfrak{R}^{6 \times 6}$ are as follows:

$$\psi(i,j) \triangleq \begin{cases} \psi(i,i-1) \ldots \psi(j+1,j) & \text{for } i > j \\ I & \text{for } i = j \\ 0 & \text{for } i < j \end{cases}$$

The structure of the operators $\psi$ and $E_\psi$ is identical to that of the operators $\phi$ and $E_\phi$ except that the elements are now $\psi(i,j)$ rather than $\phi(i,j)$.

We refer to the expression in Eq. (4.3) as the Newton-Euler factorization of the passive arm mass matrix, $M_{pp}$. We now present results describing an alternative operator factorization and inversion of $M_{pp}$. Further discussion and the proofs of Lemmas 4.1–4.3 given below can be found in references [4.5].

Lemma 4.1: The innovations factorization of the mass matrix $M_{pp}$ is given by $$M_{pp} = [I + H_p\phi K_p]D_p[I + H_p\phi K_p]^* \quad (4.12)$$

∎

The factorization in Lemma 4.1 can also be regarded as a closed-form LDL* factorization of $M_{pp}$. The closed form operator expression for the inverse of the factor $[I+H_p\phi K_p]$ is described in Lemma 4.2 below.

Lemma 4.2: $[I + H_p\phi K_p]^{-1} = [I - H_p\psi K_p]$ ∎

Combining Lemma 4.1 and Lemma 4.2 leads to the following closed form operator expression for the inverse of the mass vertrix $M_{pp}$.

Lemma 4.3: $M_{pp}^{-1} = [I - H_p\psi K_p]^* D_p^{-1}[I - H_p\psi K_p]$ ∎

The factorization in Lemma 4.3 can be regarded as a closed-form LDL* factorization of $M_{pp}^{-1}$. Using the operator expression for the inverse of $M_{pp}$ in Lemma 4.2 together with Eq. (4.5), the following lemma describes new closed form operator expressions for the $S_{ij}$ matrices.

Lemma 4.4:

$$\begin{aligned}
S_{pp} &= [I - H_p\psi K_p]^* D_p^{-1}[I - H_p\psi K_p] & (4.13a)\\
S_{ap} &= H_a\{\psi K_p + P\psi^* H_p^* D_p^{-1}[I - H_p\psi K_p]\} & (4.13b)\\
&= H_a\{(\psi - P\Omega)K_p + P\psi^* H_p^* D_p^{-1}\}\\
S_{aa} &= H_a[\psi M\psi^* - P\Omega P]H_a^* & (4.13c)\\
&= H_a[(\psi - P\Omega)P + P\psi^*]H_a^*
\end{aligned}$$

where $$\Omega \stackrel{\Delta}{=} \psi^* H_p^* D_p^{-1} H_p\psi \quad (4.14)$$

∎

The expressions for the $S_{ij}$ matrices in Lemma 4.4 require only the inverse of the block-diagonal matrix $D_p$—an inverse that is relatively easy to obtain.

5. Recursive O(N) Dynamics Algorithm

We now derive a recursive O(N) algorithm for the dynamics of under-actuated manipulators. One of the primary computations for control is the computation of the actuator generalized forces—$T_a$—needed to obtain a desired acceleration $\dot{\beta}_a$ at the active hinges, and the induced accelerations $\dot{\beta}_p$ at the passive hinges. We first use Lemma 4.4 to obtain expressions for $\dot{\beta}_p$, the active hinge forces vector $T_a$, and the link spatial accelerations vector $\beta$. As described in the lemma below, we introduce the new quantities $Z, \epsilon_p$ and $\nu_p$ to simplify these expressions.

Lemma 5.1: We have $$\alpha = \psi^*[H_p^*\nu_p + H_a^*\dot{\beta}_a + a] \quad (5.1a)$$

$$\dot{\beta}_p = [I - H_p\psi K_p]^*\nu_p - K_p^*\psi^*[H_a^*\dot{\beta}_a + a] = \nu_p - K_p^*\alpha \quad (5.1b)$$

$$T_a = H_a\{z + P\psi^*\nu_p - \psi^*(H_a^*\dot{\beta}_a - a)\} = \quad (5.1c)$$

$$H_a P[\alpha - H_a^*\dot{\beta}_a - a] + z$$

where $$z \stackrel{\Delta}{=} \psi[K_p T_p + b + P(H_a^*\dot{\beta}_a + a)]$$

$$\epsilon_p \stackrel{\Delta}{=} T_p - H_p z$$

$$\nu_p \stackrel{\Delta}{=} D_p^{-1}\epsilon_p$$

∎

The ability to convert spatial operator expression into fast recursive algorithms by inspection is one of the major advantages of the spatial operator approach. This is a direct consequence of the special structure of the operators such as $\phi$ and $\psi$ and is discussed in more detail in references [4.5]. We use this feature to convert the closed form operator expressions for the vectors $\dot{\beta}_p$ $T_a$ in Lemma 5.1 into a recursive O(N) computational algorithm. This algorithm requires a recursive tip-to-base sweep followed by a base-to-tip sweep as described below. In the following algorithm, f(k) is a link interaction force between adjoining links; z(k) is a residual link force attributable to coupling of passive and active joint forces of preceding links; $\epsilon_p(k)$ is the resulting joint force on a passive joint due to the passive joint force and the residual link force; and, $\nu_p(k)$ is the resulting joint acceleration due to the resulting joint force;

$$\begin{cases}
z(0) = 0 & (5.2a)\\
\text{for } k = 1 \ldots n\\
\quad \begin{cases}
\text{if } k \in I_a\\
\quad z(k) = \phi(k,k-1)z^+(k-1) + b(k) +\\
\qquad P(k)[H^*(k)\dot{\beta}_a(k) + a(k)]\\
\quad z^+(k) = z(k)\\
\text{else}\\
\quad z(k) = \phi(k,k-1)z^+(k-1) + b(k) + P(k)a(k)\\
\quad \epsilon_p(k) = T_p(k) - H(k)z(k)\\
\quad z^+(k) = z(k) + G_p(k)\epsilon_p(k)\\
\quad \nu_p(k) = D_p^{-1}\epsilon_p(k)\\
\quad \text{end if}
\end{cases}\\
\text{end loop}
\end{cases}$$

$$\begin{cases}
\alpha^+(n+1) = 0 & (5.2b)\\
\text{for } k = n \ldots 1\\
\quad \alpha^+(k) = \phi^*(k+1,k)\alpha(k+1)\\
\quad \begin{cases}
\text{if } k \in I_a\\
\quad f(k) = P(k)\alpha^+(k) + z(k)\\
\quad T_a(k) = H(k)f(k)\\
\text{else}\\
\quad \dot{\beta}_p(k) = \nu_p(k) - G_p(k)\alpha^+(k)\\
\quad \text{end if}
\end{cases}\\
\quad \alpha(k) = \alpha^+(k) + H^*(k)\dot{\beta}(k) + a(k)\\
\text{end loop}
\end{cases}$$

Figure 4:
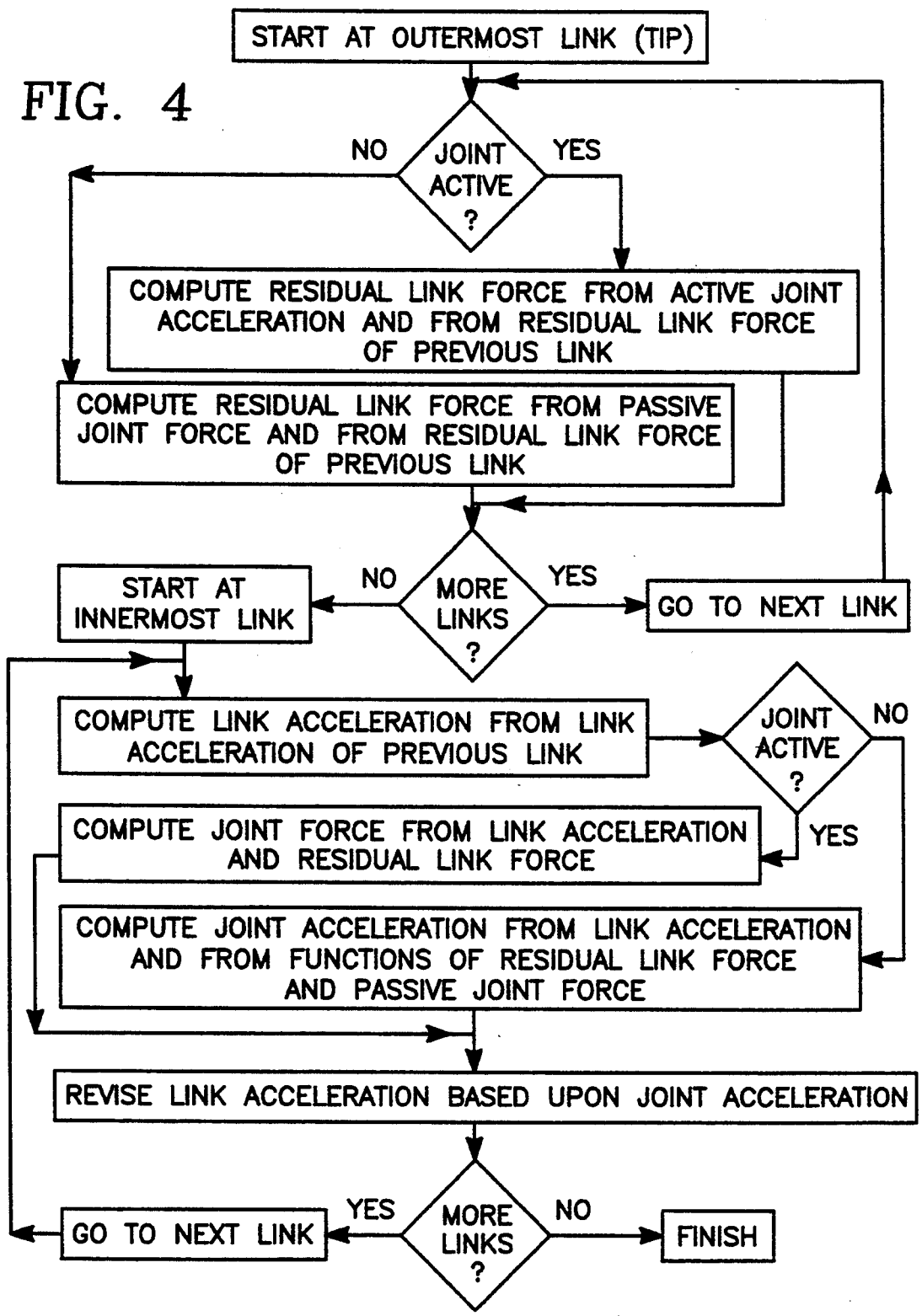
FIG. 4 is a block diagram illustrating a general recursive dynamic algorithm for computing the active joint forces from the user-specified active joint accelerations.
Figure 5A:
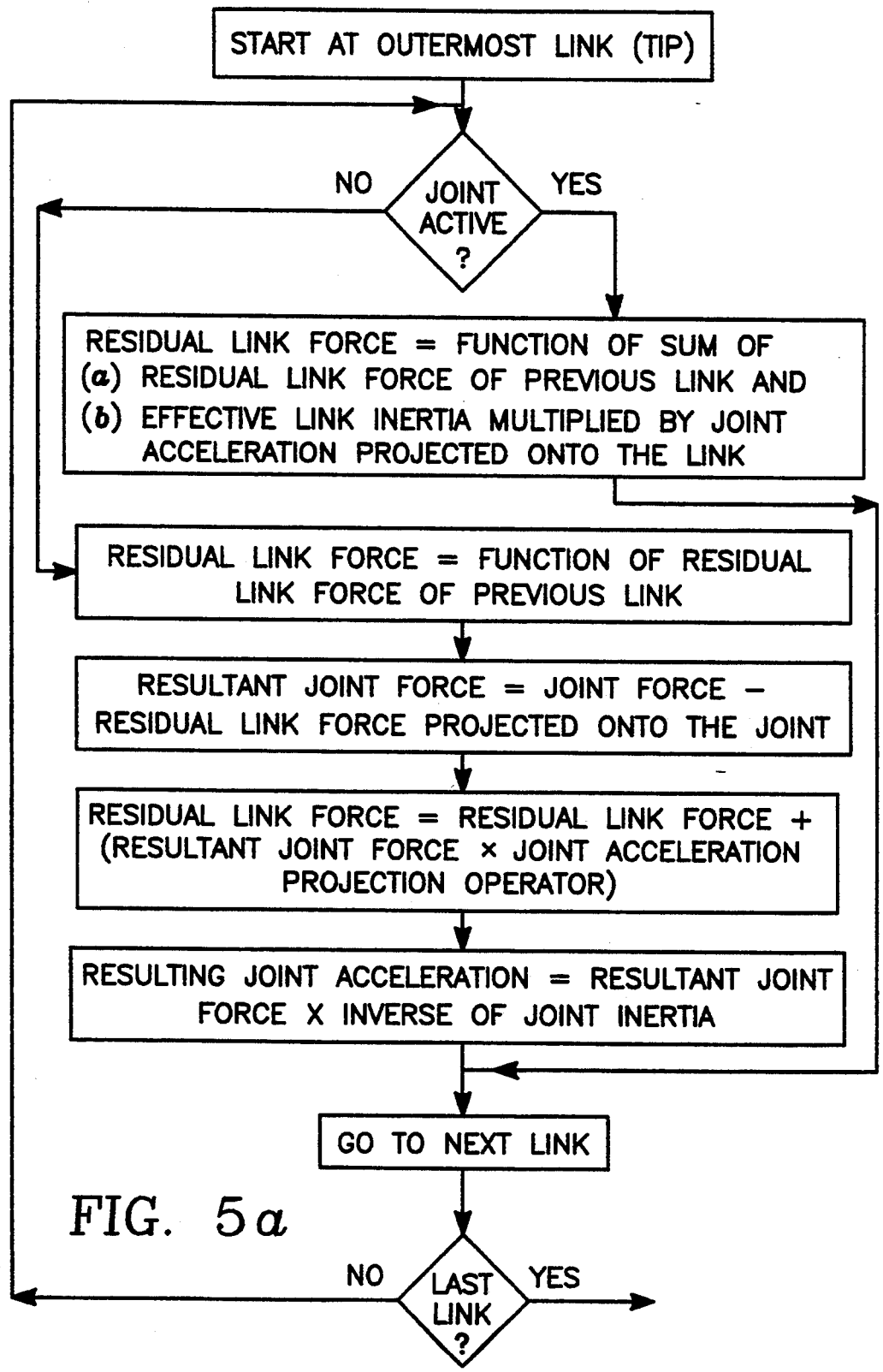
FIG. 5a and FIG. 5b comprise a block diagram illustrating in detail the preferred embodiment of the algorithm of FIG. 4.
Figure 5B:
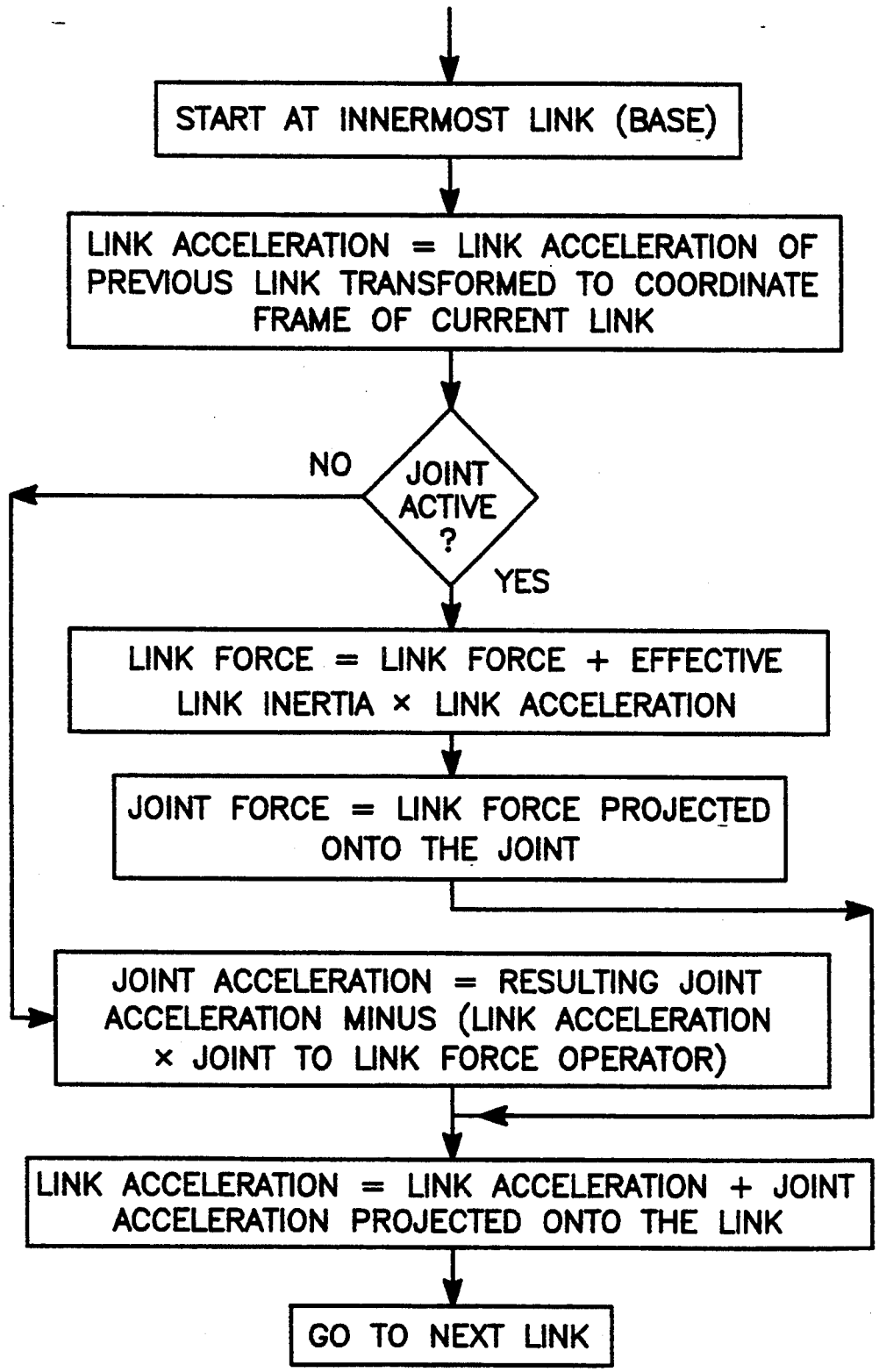

An overview of the foregoing algorithm is illustrated in FIG. 4. The algorithm is illustrated in detail in FIG. 5a and FIG. 5b.

Once again we can visualize the recursions in Eq. (5.2) as a walk across the links of the manipulator. The walk starts from the tip to the base in Eq. (5.2a). At each hinge, its active/passive status is checked. If the hinge is active, its acceleration is known, and it is used to update the residual force z(.). On the other hand, if the hinge is passive, its generalized force is known, and it is used instead to update the residual force. This part of the walk continues until the base is reached. Now a new walk from the base towards the tip is begun. This time as each new hinge is encountered, if it is passive, its unknown acceleration is computed, while if the hinge is active, its unknown generalized force is computed. This continues until the tip is reached and all the hinges have been processed. In summary, this dynamics algorithm requires the following 3 steps illustrated in FIG. 6:

1. The recursive computation of all the link velocities V(k), and the Coriolis terms a(k) and b(k) using a base-to-tip recursion sweep as in the standard Newton-Euler inverse dynamics algorithm in Eq. (3.1).

2. Recursive computation of the articulated body quantities using the tip-to-base recursive sweep described in Eq. (4.8).

3. The inward tip-to-base recursive sweep in Eq. (5.2a) to compute the residual forces z(k). This is followed by the base-to-tip recursive sweep in Eq. (5.2b) to compute the $\hat{\beta}_p$, $T_a$ and $\alpha$.

Figure 6:
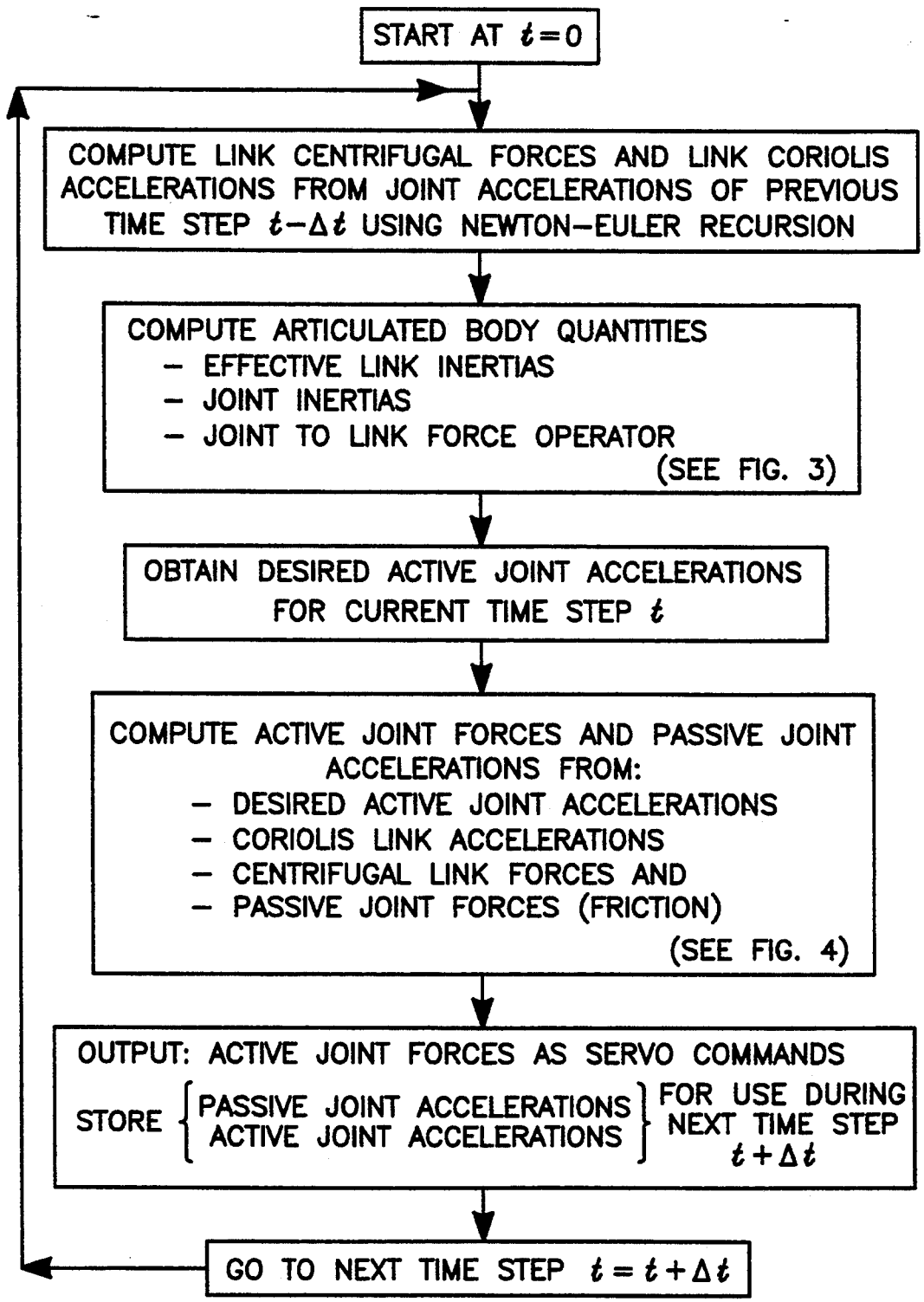
FIG. 6 is a block diagram illustrating how the recursive dynamics algorithm of FIG. 4 is repeated over successive time steps to perform motion planning, for example.

In accordance with FIG. 6, in one embodiment of the invention the foregoing three steps comprise a cycle which is repeated in successive time steps. This is useful, for example for performing robot motion planning to generate a sequence of active joint forces (and corresponding servo commands) to achieve a desired robot motion. At each time step, the active joint accelerations have been predetermined in accordance with the desired robot motion (e.g., a user-desired end-effector velocity profile), and the active joint accelerations for the current time step are retrieved in Step 1 above. The Coriolis accelerations a(k) and centrifugal forces b(k) of the active links are computed by integrating the active joint accelerations. However, the passive joint accelerations for the current time step are determined in Step 2 and are therefore unknown in Step 1. Accordingly, the Coriolis accelerations a(k) and centrifugal forces b(k) of the passive links must be computed by integrating the passive joint accelerations computed during the previous time step.

Note that the recursions in Step (2) can be combined and carried out in conjunction with the tip-to-base sweep in Step (3). Since each recursive step for a link in the above algorithm has a fixed computational cost, the overall computational cost of the algorithm is linear in both $N_a$ and $N_p$, i.e. linear in N. The algorithm is therefore an O(N) algorithm. Note however that the costs associated with passive degrees of freedom is larger than that for active hinge. Note that the overhead associated with transitions between passive and active status of the hinge is very small for this algorithm. When such a transition occurs during run-time, the only change required is to update the sets $I_p$ or $I_a$.

An interesting feature of this dynamics algorithm is that its structure is a hybrid of known inverse and forward dynamics algorithms for regular manipulators. When all the hinges are passive, $I_a$ is empty and the steps in the above algorithm reduce to the well known O(N) articulated body forward dynamics algorithm [12.4]. In this case, P(k) is the articulated body inertia of all the links outboard of the $k^{th}$ link. In the other extreme case, when all the hinges are active hinges, $I_p$ is empty, and the steps in the algorithm reduce to the composite rigid body inertias based O(N) inverse dynamics algorithm [5]. In this case, P(k) is the composite rigid body inertia of all the links that are outboard of the $k^{th}$ link.

6. Kinematical Quantities

In this section we study the kinematical properties of under-actuated manipulators. The term kinematical is used rather loosely to parallel its use for regular manipulators. As we shall see, "kinematical" quantities such as the Jacobians etc. depend not only upon the kinematical quantities such as link lengths etc., but also upon dynamical quantities such as link inertias and masses. We begin by looking at the permissible virtual displacements for the under-actuated manipulator and in the process define a projection operator which plays a fundamental role in the defining the structure of kinematical and dynamical quantities for the manipulator. For the remainder of this section, we assume that the generalized force vector for the passive hinges $T_p$ is zero.

6.1 The Projection Operators T and $\overline{T}$

The operators T and $\overline{T}$ are defined as follows:

$$T \triangleq \Omega M, \text{ and } \overline{T} \triangleq I - T = I - \Omega M$$

The following lemma shows that T and $\overline{T}$ are indeed projection operators.

Lemma 6.1: The operators T and $\overline{T}$ are projection operators, i.e., $$T^2 = T, \text{ and } \overline{T}^2 = \overline{T} \tag{6.1}$$

Moreover, rank[T]=$N_p$, and rank[$\overline{T}$]=$N_a$. Also, $$\overline{T}\phi^* = \overline{T}\psi^* = \psi^* - \Omega P \tag{6.2}$$

$$\overline{T}\phi^* H_p^* = \overline{T}\psi^* H_p^* = 0 \tag{6.3}$$

The notion of virtual displacements plays a fundamental role in understanding the behavior of dynamical systems. Virtual displacements characterize the possible "permissible" motions of constrained bodies. The virtual displacement matrix defines the mapping between a displacement of the generalized velocities and the displacement of the component bodies. From Eq. (3.2) the spatial acceleration $\alpha$ of the links in a regular manipulator is given by $$\alpha = \phi^* H^* \hat{\beta} + \text{velocity dependent terms}$$

Hence the virtual displacement matrix V for a regular manipulator is given by $$V = \phi^* H^* \tag{6.4}$$

Similarly, the virtual displacement matrix $V_a$ for the active arm $A_a$ is given by $$V_a = \phi^* H_a^* \tag{6.5}$$

Lemma 6.2: The virtual displacement matrix $V_U$ for the under-actuated manipulator is given by $$V_U = \overline{T}\phi^* H_a^* = \overline{T}V_a = \overline{T}V \tag{6.6}$$

The virtual displacement matrix for an under-actuated arm is related to the virtual displacement matrices for both the regular and the active arm $A_a$ via the projection operator $\overline{T}$. It follows directly from Eq. (6.6) that if $\delta$ is a permissible virtual displacement for the regular manipulator (or for the active arm $A_a$), then $\bar{T}\delta$ is a valid virtual displacement for the under-actuated manipulator. Since $\bar{T}$ is of rank $N_a$, the role of $\bar{T}$ is to project the virtual displacement of the regular arm from a N dimensional tangent space onto the smaller $N_a$ dimensional tangent space for under-actuated manipulators.

From the expression for $T_a$ in Eq. (4.4) it is apparent that the mass matrix for the under-actuated manipulator $M_U$ is given by $S_{aa}$. A new expression for the mass matrix based upon the projection operator $\bar{T}$ is described in the following lemma.

Lemma 6.3:

$$M_U = S_{aa} = H_a\phi(\bar{T}^*M\bar{T})\phi^*H_a^* = H\phi(\bar{T}^*M\bar{T})\phi^*H^* \quad (6.7)$$

Note that the mass matrix of the regular manipulator is given by $H\phi M\phi^*H^*$, while that of the active arm $A_a$ is given by $H_a\phi M\phi^*H_a^*$. Thus the mass matrix $M_U$ of the under-actuated manipulator is related to the mass matrices of the corresponding regular and active manipulators in a simple manner by the projection operator $\bar{T}$. Indeed, in this case, replacing M by $\bar{T}^*M\bar{T}$ results in a regular/active manipulator with the same mass matrix as that of the under-actuated manipulator.

6.2 Jacobians for Under-Actuated Manipulators

Motion planning and control algorithms for regular manipulators make use of the end-effector Jacobian of the manipulator. Moreover, many of the key Jacobian related computations can be carried out by means of efficient recursive algorithms. But for the increase complexity, these statements are also true for under-actuated manipulators.

6.2.1 The Generalized Jacobian $J_G$

The generalized Jacobian $J_G$ defines the relationship between the motion of the active hinges and the motion of the end-effector frame as described below:

$$\alpha(0) = J_G\dot{\beta}_a + \text{velocity dependent terms}$$

The generalized Jacobian is important for describing the local behavior of the end effector. The expression for $J_G$ is given in the following lemma.

Lemma 6.4: The generalized Jacobian $J_G$ for an underactuated manipulator is given by $$J_G \triangleq B^*\bar{T}\phi^*H_a^* = B^*\bar{T}\phi^*H^* = B^*[\psi^* - \Omega P]H_a^* \quad (6.8)$$

where $\Omega$ is defined in Equation 4.14 above.

Proof: This follows from Lemma 6.2 and the fact that $\alpha(0) = B^*\alpha$. ∎

We see from Eq. (6.8) that for under-actuated manipulators, the kinematical as well as the inertial properties of the links enter into the structure of the Jacobian via the projection operator $\bar{T}$. In contrast, for regular manipulators, the end-effector Jacobian is purely a function of the kinematical properties of the manipulator. Comparing with Eq. (3.5), we see that the deviation of $J_G$ from the Jacobian of the regular manipulator, J, is given by the projection operator $\bar{T}$. For space manipulators, singularity analysis of $J_G$ is used to study the desirable and undesirable regions of the workspace [11] as well as for control using methods such as Resolved Rate Control [9]. Similar techniques can also be applied to the class of under-actuated manipulators as well.

Figure 7:
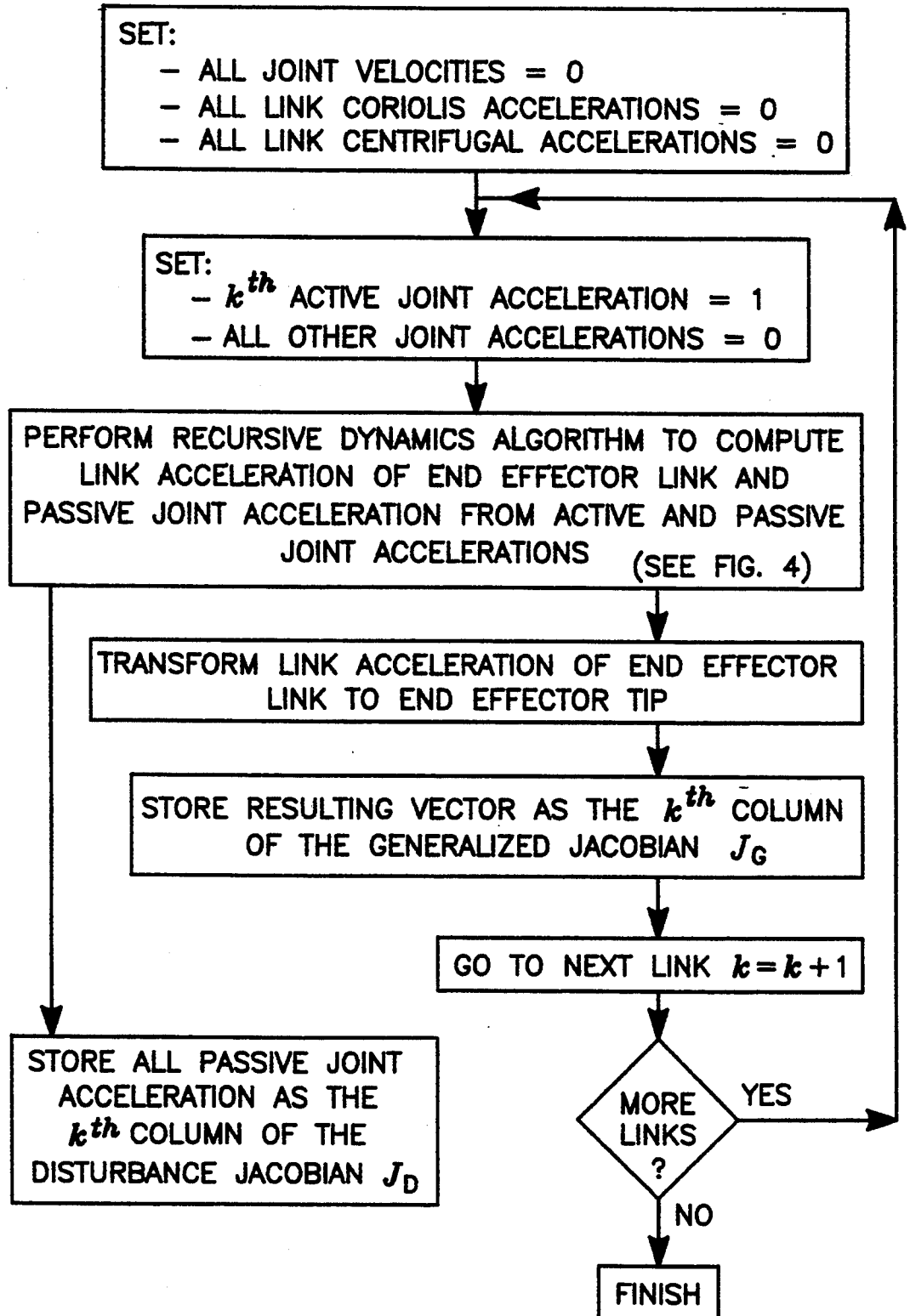
FIG. 7 is a block diagram illustrating a modified version of the recursive dynamics algorithm of FIG. 4 used to compute the generalized Jacobian operator and the disturbance Jacobian operator.

The computation of $J_G$ can be carried out recursively. For these computations, all the hinge velocities are set to zero. This implies that the nonlinear velocity dependent terms a(k) and b(k) are zero for all links. Next, all the articulated body quantities are computed using the tip-to-base recursion in Eq. (4.8). The following procedure illustrated in FIG. 7 then results in the computation of the $k^{th}$ column of $J_G$:

1. Set $\dot{\beta}_a(k) = 1$, and all the other active hinge accelerations to 0.
2. Use the tip-to-base and base-to-tip recursions in Eq. (5.2) to compute the spatial acceleration $\alpha(1)$ of the end-effector link.
3. The $k^{th}$ column of $J_G$ is $\phi^*(1,0)\alpha(1)$.

Repeating this procedure for each of the $n_a$ columns yields the complete generalized Jacobian matrix $J_G$. Storage of some of the intermediate quantities can be used to reduce the computational cost of the above procedure. For a given vector x, setting $\dot{\beta}_a = x$ and carrying out only a single evaluation Step (2) above results in the computation of the matrix-vector product $J_G x$. While the recursive structure of the algorithm is in line with the recursive structure of similar computations for regular manipulators, the Step (2) above requires a tip-to-base recursion in addition to the single base-to-tip recursion needed for regular manipulators.

6.2.2 Computations of the Actuator Forces Corresponding to a Desired End-Effector Trajectory The generalized Jacobian can be used to compute the active hinge generalized forces $T_a(t)$ required to achieve a desired end-effector time trajectory as defined by its spatial acceleration $\alpha_0(t)$. We assume that the state of the manipulator is known at the beginning, i.e., the configuration $\theta(t_0)$ and hinge velocities $\beta(t_0)$ are known at time $t = t_0$ and that an integration time step $\Delta t$ is being used. A brief sketch of the computational steps at time t is described below, in accordance with the illustrations of FIG. 8a:

1. Compute $J_G(t)$.
2. Compute $\dot{\beta}_a(t)$ via $$\dot{\beta}_a(t) = J_G^{-1}(t)[\alpha_0(t) - \text{velocity dependent terms}]$$

3. Compute $T_a(t)$ and $\dot{\beta}_p(t)$ using the algorithm in Section 5.
4. Integrate the hinge accelerations and velocities to obtain the hinge velocities $\beta(t+\Delta t)$ and positions $\theta(t+\Delta t)$ at time $t+\Delta t$. Go back to Step 1 and repeat the steps for time $(t+\Delta t)$.

The velocity dependent terms in Step 2 are as follows:

$$B^*\psi^*\{H_p^*D_p^{-1}[T_p - H_p\psi(K_pT_p + b + Pa)] + a\} + a(0).$$

This iterative procedure results in a time profile for the actuator forces $T_a(t)$ required to achieve the desired end-effect trajectory. It also results in the trajectory of the passive hinges for the whole time interval as well. For simplicity, we assumed above that $J_G$ is square and non-singular. This procedure can be modified (as in the usual ways for regular manipulators) when the Jacobian is singular, or there are redundant active hinge degrees of freedom available, or only a subset of end-effector variables are specified (such as for pointing applications).

6.2.3 The Disturbance Jacobian $J_D$

In applications where the number of active degrees of freedom is larger than that needed to meet the primary task (such as end-effector motion) for the manipulator, the extra active degrees of freedom can be used to meet other secondary objectives. One such important objective is the optimization of the motion of the passive hinges for the purpose of minimizing disturbance or for collision avoidance etc. The disturbance Jacobian $J_D$ is the key for studying the inertial coupling between the active and the passive hinges. This Jacobian describes the "disturbance" motion induced into the passive hinges due to the motion of the active hinges as follows $$\ddot{\beta}_p = J_D \dot{\beta}_a + \text{velocity dependent terms}$$

In [8], $J_D$ has been used to study the motions of a space robot which minimizes the the disturbance that the manipulator imparts to the base body.

Lemma 6.5: The operator expression for the disturbance Jacobian $J_D$ of an under-actuated manipulator is given by:

$$J_D = -S_{ap}{}^* = -[I - H_p \psi K_p]^* D_p{}^{-1} H_p \psi -$$
$$PH_a{}^* - K_p{}^* \psi {}^* H_a{}^* \qquad (6.9)$$

Proof: This follows from Eq. (4.13b). ■

The computation of $J_D$ can be carried out simultaneously with the computation of $J_G$ via the algorithm described earlier in Section 6.2.1. Thus the $k^{th}$ column of $J_D$ is simply the vector $\ddot{\beta}_p$ computed during the steps leading to the computation of the $k^{th}$ column of $J_G$.

Figure 8A:
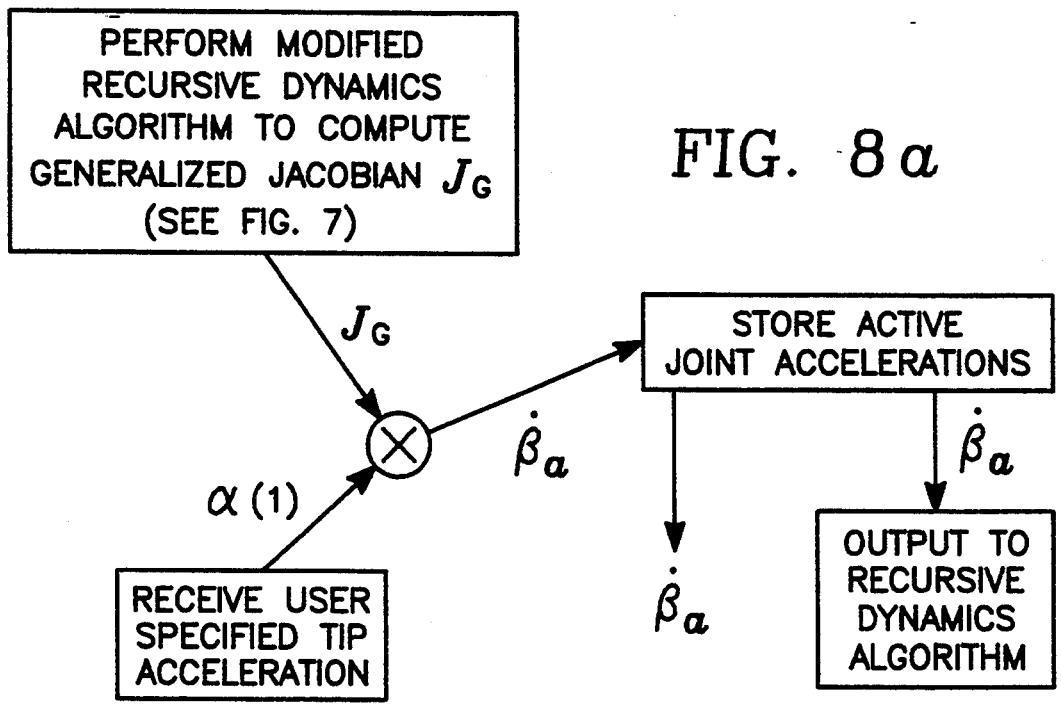
FIG. 8a and FIG. 8b are block diagrams illustrating, respectively, (a) how the generalized Jacobian operator is used to computed unknown passive joint accelerations and (b) how the disturbance Jacobian operator is used in redundancy resolution techniques to control a redundant under-actuated robot manipulator.
Figure 8B:
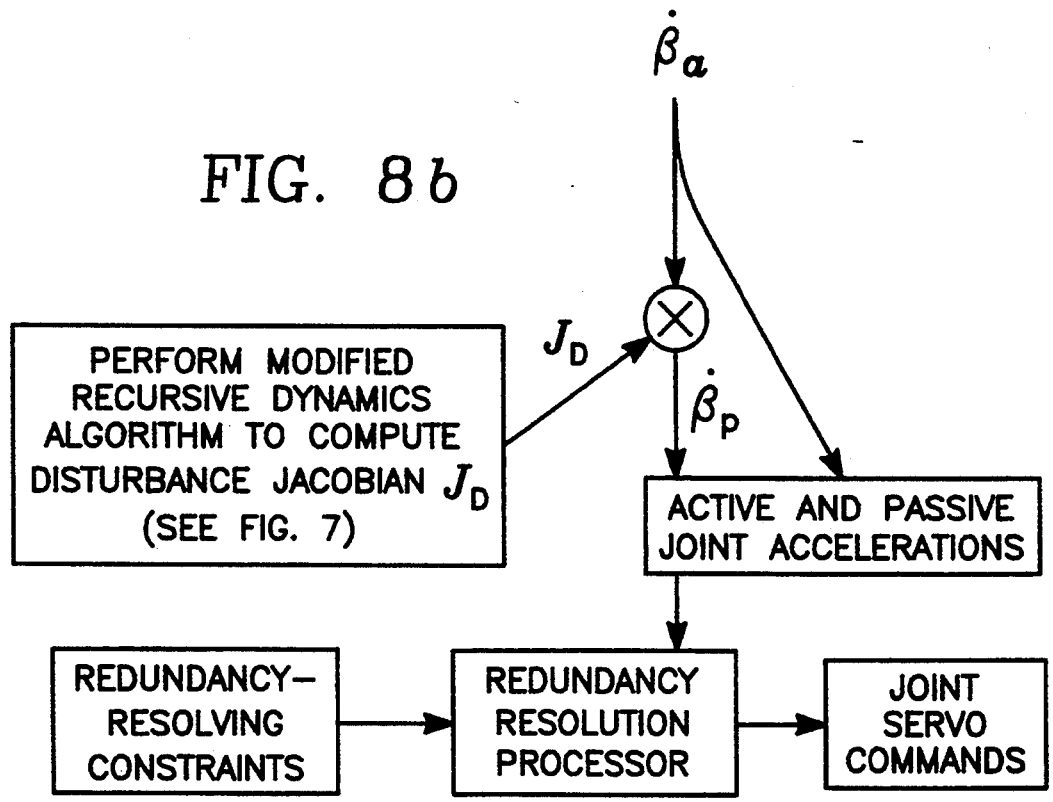

FIG. 8b illustrates how the disturbance Jacobian operator $J_D$ is used to control a redundant robot manipulator (a manipulator having at least seven degrees of freedom). As shown in FIG. 8b, the disturbance Jacobian operator is computed in accordance with the process discussed previously with reference to FIG. 7. Then, the unknown passive joint accelerations are computed by multiplying the active joint accelerations (obtained, for example, via the generalized Jacobian operator as shown in FIG. 8a). At this point, all of the joint accelerations are known, permitting computation of any changes in velocity or position. These changes are then combined with a set of predetermined redundancy resolving motion constraints by a redundancy resolution control process, which ultimately solves the robot control equations an outputs robot servo commands. Such redundancy resolution control processes are known in the art and one is disclosed, for example, in U.S. patent application Ser. No. 07/849,629 filed Mar. 11, 1992 by Homayoun Seraji, Mark K. Long and Thomas S. Lee, entitled "Configuration Control of Seven Degree of Freedom Arms" and assigned to the present assignee.

Figure 9:
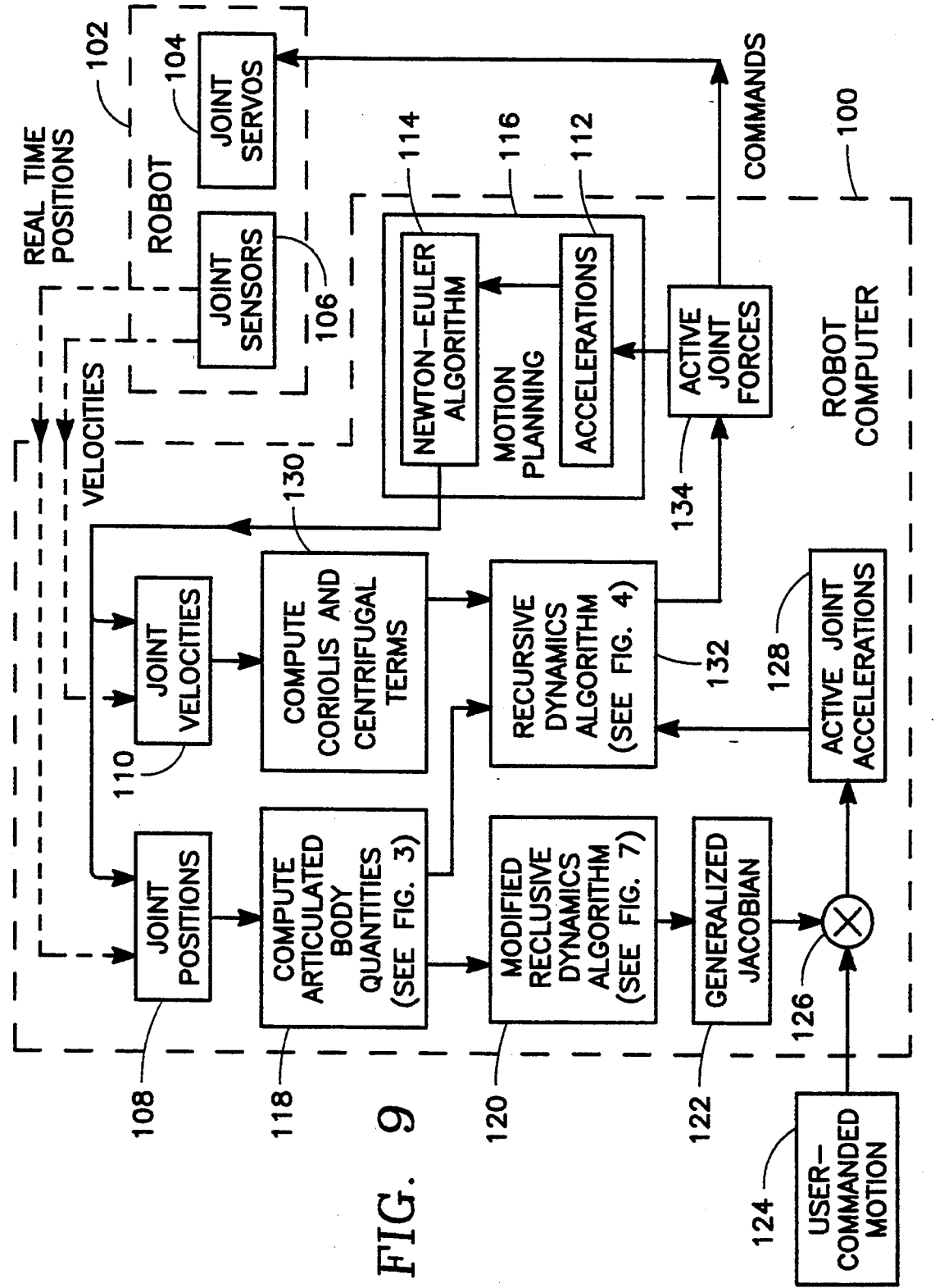
FIG. 9 is a block diagram illustrating a robot control system embodying the present invention.

FIG. 9 illustrates one exemplary system embodying the present invention and employing the processes described above. The system includes a robot control computer 100 and a robot 102 having joint servos 104 and joint sensors 106. The current link postions 108 and link velocities 110 are determined from either the joint sensors 106 or from previously computed accelerations 112 via Newton-Euler algorithm 114 in a processor 116. Then, a processor 118 computes the articulated body quantities from the link positions 108. A processor 120 then computes the generalized Jacobian operator 122 from the articulated body quantities using the modified recursive dynamics algorithm of FIG. 7. User-specified end-effector accelerations 124 (for example) are then multiplied (126) by the generalized Jacobian operator 122 to produce the active joint accelerations 128. Meanwhile, a processor 130 computes the coriolis link accelerations and centrifugal link forces from the link velocities 110. Finally, a processor 132 computes the unknown active joint forces and passive joint accelerations from the active joint accelerations 128, the articulated body quantities computed by the processor 118 and the coriolis and centrifugal terms computed by the processor 130 via the recursive dynamics algorithm of FIG. 4. A processor 134 generates joint servo commands from the active joint forces and transmits these commands to the joint servos 104. Alternatively, the processor 134 stores these commands in memory if a time profile of servo commands is to be computed in a motion planning mode prior to execution by the robot 102.

While the invention has been described in detail by specific reference to preferred embodiments thereof, it is understood that variations and modifications thereof may be made without departing from the true spirit and scope of the invention.

What is claimed is:

1. A method of controlling a robot manipulator which is under-actuated having plural links connected at respective joints therebetween whereby each link is associated with a respective joint, some of said joints being active and having their movements controlled by respective joint servos, remaining ones of said joints being passive and not having their movements controlled by respective joint servos whereby said passive joints are generally freely moveable, an innermost one of said links comprising a relatively stationary base and an outermost one of said links comprising a moveable tip link, said method comprising the steps of:
   obtaining current positions of said links, specified active joint accelerations of said active joints and passive joint forces of said passive joints;
   computing articulated body quantities for each of said joints from said current positions of said links;
   computing from said articulated body quantities and from said active joint accelerations and said passive joint forces, active joint forces of said active joints by performing a recursive dynamics algorithm; and
   transmitting servo commands corresponding to said active joint forces to respective ones of said joints servos so as to correct motion of said robot manipulator.

2. The method of claim 1 wherein said recursive dynamics algorithm comprises:
   an inward recursion comprising the following steps carried out for each link beginning with said outermost link:
   computing a residual link force from a residual link force of a previous link, from a corresponding one of said active joint accelerations if the corresponding joint is active and from a corresponding one of said passive joint forces if the corresponding joint is passive:
   an outward recursion comprising the following steps carried out for each link beginning with said innermost link:
   computing a link acceleration from a link acceleration of a previous link;
   computing from said link acceleration an active joint force if the corresponding joint is an active joint, and computing a passive joint acceleration if the corresponding joint is a passive joint; and revising said link acceleration based upon the joint acceleration of the corresponding joint.

3. The method of claim 1 wherein said articulated body quantities comprise an effective link inertia, a joint inertia, a joint to link force operator and a null force operator.

4. The method of claim 3 wherein the computing articulated body quantities comprises an inward recursion comprising the following steps carried out for each link beginning at said outermost link:

computing said effective link inertia from the effective link inertia of a previous link;

if the corresponding joint is passive:

computing said joint inertia from said effective link inertia;

computing said joint to link force operator from said effective link inertia and from said joint inertia; and computing said null force operator from said joint to link force operator;

if the corresponding joint is active, setting said null force operator equal to an identity operator; and revising said effective link inertia by transforming said effective link inertia by said null force operator.

5. The method of claim 1 wherein the obtaining specified active joint accelerations comprises:

obtaining a desired acceleration of a selected one of said links:

computing a generalized Jacobian operator relating said desired acceleration of said selected one link to the active joint accelerations of said active joints:

multiplying said desired acceleration of said selected one link by said generalized Jacobian operator to produce said active joint accelerations of said active joints.

6. The method of claim 5 wherein said one selected link is said outermost link.

7. The method of claim 5 wherein said generalized Jacobian operator comprises a matrix having plural columns and wherein the computing of said generalized Jacobian operator comprises:

setting the active joint acceleration of a successive one of said active joints to unity and the active joint accelerations of the remaining active joints to zero;

for each setting of the active joint acceleration of a successive one of said active joints to unity, performing the following recursive dynamics algorithm:

an inward recursion comprising the following step carried out for each link beginning with said outermost link:

computing a residual link force from a residual link force of a previous link, from a corresponding one of said active joint accelerations if the corresponding joint is active and from a corresponding one of said passive joint forces if the corresponding joint is passive;

an outward recursion comprising the following steps carried out for each link beginning with said innermost link:

computing a link acceleration from a link acceleration of a previous link;

computing from said link acceleration an active joint force if the corresponding joint is an active joint, and computing a passive joint acceleration if the corresponding joint is a passive joint; and revising said link acceleration based upon the joint acceleration of the corresponding joint;

storing the link acceleration of the outmost link as a successive one of the columns of said matrix of said generalized Jacobian operator.

8. The method of claim 1 wherein said passive joint forces correspond to friction forces of said passive joints.

9. The method of claim 1 wherein said robot manipulator comprises joint sensors in each of said joints, and wherein said obtaining of said current positions of said links comprises reading said joint sensors.

10. The method of claim 1 wherein said obtaining, said computing articulated body quantities and said computing said active joint forces comprise a single cycle, said method further comprising repeating said single cycle periodically in successive time steps whereby to store a time profile of said active joint forces, whereby said transmitting servo commands is performed upon completion of a plurality of said cycles corresponding to a desired movement of said robot manipulator.

11. A method of controlling a robot manipulator which is redundant and under-actuated having at least seven degrees of freedom, whereby equations of motion of said robot manipulator have a redundancy, said robot manipulator comprising plural links connected at respective movable joints therebetween whereby each link is associated with a respective joint, some of said joints being active and having their movements controlled by respective joint servos, remaining ones of said joints being passive and not having their movements controlled by respective joint servos whereby said passive joints are generally freely moveable, an innermost one of said links comprising a relatively stationary base and an outermost one of said links comprising a moveable tip link, said method comprising the steps of:

obtaining current positions of said links, specified active joint accelerations of said active joints and passive joint forces of said passive joints;

computing articulated body quantities for each of said joints from said current positions of said links;

computing from said articulated body quantities and from said active joint accelerations and said passive joint forces, a disturbance Jacobian operator relating said active joint accelerations of said active joints to passive joint accelerations of said passive joints;

computing said passive joint accelerations by combining said disturbance Jacobian operator and said active joint accelerations;

establishing a set of constraints resolving said redundancy, and computing active joint forces from said set of constraints and from said active and passive joint accelerations and transmitting joint servo commands corresponding to said active joint forces to said active joints so as to correct motion of said robot manipulator.

12. The method of claim 11 wherein said disturbance Jacobian operator comprises a matrix having plural columns, and wherein the computing of said disturbance Jacobian operator comprises:

setting an active joint velocity of a successive one of said active joints to unity while setting the active joint velocities of the remaining active joints to zero;

for each setting of the active joint acceleration of a successive one of said active joints to unity, performing the following recursive dynamics algorithm:

an inward recursion comprising the following step carried out for each link beginning with said outermost link:

computing a residual link force from a residual link force of a previous link, from a corresponding one of said active joint accelerations if the corresponding joint is active and from a corresponding one of said passive joint forces if the corresponding joint is passive;

an outward recursion comprising the following steps carried out for each link beginning with said innermost link:

computing a link acceleration from a link acceleration of a previous link;

computing from said link acceleration an active joint force if the corresponding joint is an active joint, and computing a passive joint acceleration if the corresponding joint is a passive joint; and revising said link acceleration based upon the joint acceleration of the corresponding joint;

storing said passive joint accelerations as a successive one of the columns of said matrix of said disturbance Jacobian operator.

13. Apparatus for controlling an under-actuated robot manipulator having plural links connected at respective movable joints therebetween whereby each link is associated with a respective joint, some of said joints being active and having their movements controlled by respective joint servos, remaining ones of said joints being passive and not having their movements controlled by respective joint servos whereby said passive joints are generally freely moveable, an innermost one of said links comprising a relatively stationary base and an outermost one of said links comprising a moveable tip link, said apparatus comprising:

means for obtaining current positions of said links, specified active joint accelerations of said active joints and passive joint forces of said passive joints;

means for computing articulated body quantities for each of said joints from said current positions of said links;

means for computing from said articulated body quantities and from said active joint accelerations and said passive joint forces, active joint forces of said active joints by performing a recursive dynamics algorithm; and means for transmitting servo commands corresponding to said active joint forces to respective ones of said joint servos so as to correct motion of said robot manipulation.

14. The apparatus of claim 13 wherein said means for performing a recursive dynamics algorithm comprises:

means for computing, for each link successively beginning with said outermost link, a residual link force from a residual link force of a previous link, from a corresponding one of said active joint accelerations if the corresponding joint is active and from a corresponding one of said passive joint forces if the corresponding joint is passive;

means for computing, for each link successively beginning with said innermost link, a link acceleration from a link acceleration of a previous link;

means for computing from said link acceleration an active joint force if the corresponding joint is an active joint, and computing a passive joint acceleration if the corresponding joint is a passive joint, for each link successively beginning with said innermost link; and means for revising, for each link successively beginning with said innermost link, said link acceleration based upon a joint acceleration of the corresponding joint.

15. The apparatus of claim 13 wherein said articulated body quantities comprise an effective link inertia, a joint inertia, a joint to link force operator and a null force operator.

16. The apparatus of claim 15 wherein the means for computing articulated body quantities comprises an inward recursion processor operative for each link beginning at said outermost link, comprising:

means for computing said effective link inertia from the effective link inertia of a previous link;

means operative if the corresponding joint is passive for computing:

said joint inertia from said effective link inertia;

said joint to link force operator from said effective link inertia and from said joint inertia; and said null force operator from said joint to link force operator;

means operative if the corresponding joint is active for setting said null force operator equal to an identity operator; and means for revising said effective link inertia by transforming said effective link inertia by said null force operator.

17. The apparatus of claim 13 wherein the means for obtaining specified active joint acceleration comprises:

means for obtaining a desired acceleration of a selected one of said links;

means for computing a generalized Jacobian operator relating said desired acceleration of said selected one link to the active joint accelerations of said active joints;

means for multiplying said desired acceleration of said selected one link by said generalized Jacobian operator to produce said active joint accelerations of said active joints.

18. The apparatus of claim 17 wherein said one selected link is said outermost link.

19. The apparatus of claim 17 wherein said generalized Jacobian operator comprises a matrix having plural columns and wherein the means for computing said generalized Jacobian operator comprises:

means for setting the active joint acceleration of a successive one of said active joints to unity and the active joint accelerations of the remaining active joints to zero;

means operative for each setting of the active joint acceleration of a successive one of said active joints to unity, for performing a recursive dynamics algorithm, comprising:

means for computing, for each link beginning with said outermost link, a residual link force from a residual link force of a previous link, from a corresponding one of said active joint accelerations if the corresponding joint is active and from a corresponding one of said passive joint forces if the corresponding joint is passive;

means for computing, for each link beginning with said innermost link, a link acceleration from a link acceleration of a previous link;

means for computing from said link acceleration an active joint force if the corresponding joint is an active joint, and computing a passive joint acceleration if the corresponding joint is a passive joint, for each link beginning with said innermost link;

means for revising, for each link beginning with said innermost link, said link acceleration based upon the joint acceleration of the corresponding joint; and means for storing the link acceleration of the outermost link as a successive one of the columns of said matrix of said generalized Jacobian operator.

20. The apparatus of claim 13 wherein said passive joint forces correspond to friction forces of said passive joints.

21. The apparatus of claim 13 wherein said robot manipulator comprises joint sensors in each of said joints, and wherein said means for obtaining said positions of said links comprises means for reading said joint sensors.

22. Apparatus for controlling a robot manipulator which is redundant and under-actuated having at least seven degrees of freedom, whereby equations of motion of said under-actuated robot manipulator have a redundancy, said robot manipulator comprising plural links connected at respective movable joints therebetween whereby each link is associated with a respective joint, some of said joints being active and having their movements controlled by respective joint servos, remaining ones of said joints being passive and not having their movements controlled by respective joint servos whereby said passive joints are generally freely moveable, an innermost one of said links comprising a relatively stationary base and an outermost one of said links comprising a moveable tip link, said apparatus comprising:

means for obtaining current positions of said links, specified active joint accelerations of said active joints and passive joint forces of said passive joints;

means for computing articulated body quantities for each of said joints from said current positions of said links;

means for computing from said articulated body quantities and from said active joint accelerations and said passive joint forces, a disturbance Jacobian operator relating said active joint accelerations of said active joints to passive joint accelerations of said passive joints;

means for computing said passive joint accelerations by combining said disturbance Jacobian operator and said active joint accelerations;

means for establishing a set of constraints resolving said redundancy, and computing active joint forces from said set of constraints and from said active and passive joint accelerations and transmitting joint servo commands corresponding to said active joint forces to said active joints so as to correct motion of said robot manipulator.

23. The apparatus of claim 22 wherein said disturbance Jacobian operator comprises a matrix having plural columns, and wherein the means for computing said disturbance Jacobian operator comprises:

means for setting an active joint velocity of a successive one of said active joints to unity while setting the active joint velocities of the remaining active joints to zero;

means operative for each setting of the active joint acceleration of a successive one of said active joints to unity, for performing a recursive dynamics algorithm, comprising:

means for computing, for each link beginning with said outermost link, a residual link force from a residual link force of a previous link, from a corresponding one of said active joint accelerations if the corresponding joint is active and from a corresponding one of said passive joint forces if the corresponding joint is passive;

means for computing, for each link beginning with said innermost link, a link acceleration from a link acceleration of a previous link;

means for computing from said link acceleration an active joint force if the corresponding joint is an active joint, and a passive joint acceleration if the corresponding joint is a passive joint, for each link beginning with said innermost link;

means for revising, for each link beginning with said innermost link, said link acceleration based upon the joint acceleration of the corresponding joint; and means for storing said passive joint accelerations as a successive one of the columns of said matrix of said disturbance Jacobian operator.

24. A method of controlling an under-actuated robot manipulator comprising active joints associated with active links and passive joints associated with passive links, including an outermost one of said links and an innermost one of said links, said method comprising the steps of:

obtaining predetermined active joint accelerations of the active joints and passive joint friction forces of the passive joints;

computing articulated body quantities for each of the passive and active joints from the current positions of the passive and active links;

computing from the articulated body quantities and from the active joint accelerations and the passive joint friction forces, active joint forces of the active joints by performing a recursive dynamics algorithm; and producing and transmitting servo commands corresponding to the active joint forces to respective ones of the joint servos so as to correction motion of said robot manipulator.

25. The method of claim 24 wherein the computing of the active joint forces comprises:

computing for each link beginning with the outermost link the residual link force of each link;

computing for each link beginning with the innermost link the active joint force from the residual link force if the corresponding joint is active.

26. The method of claim 25 wherein the computing of the residual link force comprises computing said residual link force from the active joint acceleration if the corresponding joint is active or from the passive joint friction force if the corresponding joint is passive.

27. The method of claim 25 wherein the computing of the active joint force is replaced by computing a passive joint acceleration acceleration from the residual link force if the corresponding joint is passive, and wherein the computing of the active joint force of a subsequent link is affected by said passive joint acceleration.

* * * * *